(12) United States Patent
Mayer et al.

(10) Patent No.: US 8,073,327 B2
(45) Date of Patent: Dec. 6, 2011

(54) SYSTEM AND METHOD FOR IMPROVING THE EFFICIENCY OF ROUTERS ON THE INTERNET AND/OR CELLULAR NETWORKS AND/OR OTHER NETWORKS AND ALLEVIATING BOTTLENECKS AND OVERLOADS ON THE NETWORK

(76) Inventors: Yaron Mayer, Jerusalem (IL); Al J. C. Baur, Kibbutz Ramat Hashofet (IL)

( * ) Notice: Subject to any disclaimer, the term of this patent is extended or adjusted under 35 U.S.C. 154(b) by 642 days.

(21) Appl. No.: 11/928,098

(22) Filed: Oct. 30, 2007

(65) Prior Publication Data

US 2008/0145050 A1 Jun. 19, 2008

Related U.S. Application Data

(63) Continuation-in-part of application No. 10/375,208, filed on Feb. 17, 2003, now abandoned, which is a continuation-in-part of application No. 10/328,622, filed on Dec. 26, 2002, now abandoned, which is a continuation-in-part of application No. PCT/IL01/01042, filed on Nov. 8, 2001, said application No. 10/375,208 is a continuation-in-part of application No. PCT/IL02/01049, filed on Dec. 29, 2002, which is a continuation-in-part of application No. PCT/IL01/01042.

(60) Provisional application No. 60/344,455, filed on Dec. 26, 2001, provisional application No. 60/353,781, filed on Jan. 29, 2002, provisional application No. 60/356,554, filed on Feb. 10, 2002, provisional application No. 60/358,231, filed on Feb. 14, 2002, provisional application No. 60/358,202, filed on Feb. 18, 2002, provisional application No. 60/359,555, filed on Feb. 19, 2002, provisional application No. 60/266,730, filed on Feb. 5, 2001, provisional application No. 60/299,919, filed on Jun. 19, 2001.

(51) Int. Cl.
*H04J 14/08* (2006.01)
*H04J 3/26* (2006.01)
*H04J 14/02* (2006.01)
*H04L 12/00* (2006.01)

(52) U.S. Cl. ............... 398/54; 398/53; 398/52; 398/43; 398/44

(58) Field of Classification Search .................. 398/51, 398/54–57, 52, 44, 43, 53
See application file for complete search history.

(56) References Cited

U.S. PATENT DOCUMENTS

| | | | | |
|---|---|---|---|---|
| 4,939,726 A | * | 7/1990 | Flammer et al. | 370/400 |
| 5,309,433 A | * | 5/1994 | Cidon et al. | 370/390 |
| 5,488,501 A | * | 1/1996 | Barnsley | 398/51 |
| 5,786,923 A | * | 7/1998 | Doucet et al. | 398/122 |

(Continued)

*Primary Examiner* — Shi K Li
*Assistant Examiner* — Oommen Jacob
(74) *Attorney, Agent, or Firm* — Dennison, Schultz & MacDonald

(57) ABSTRACT

Optical routers are currently unable to do packet switching except by translating the data to electronic data and then back, which is very inefficient. The present invention solves this problem by optically marking and detecting the packet headers or parts of them, translating at most only the headers or parts of them to electronics for making packet switching decisions, and keeping the rest of the packets in optical delay lines, and solving response-time problems. Another optimization described in this invention is improving routing efficiency and bandwidth utilization by grouping together identical data packets from the same source going to the same general area with a multiple list of targets connected to each copy of the data and sent together to the general target area. Another important optimization is a new architecture and principles for routing based on physical geographical IP addresses.

16 Claims, 3 Drawing Sheets

U.S. PATENT DOCUMENTS

| | | | |
|---|---|---|---|
| 5,801,863 A * | 9/1998 | Fatehi et al. | 398/79 |
| 5,864,414 A * | 1/1999 | Barnsley et al. | 398/71 |
| 6,111,673 A * | 8/2000 | Chang et al. | 398/79 |
| 6,167,438 A * | 12/2000 | Yates et al. | 709/216 |
| 6,292,464 B1 * | 9/2001 | Elahmadi et al. | 370/223 |
| 6,600,583 B1 * | 7/2003 | Fatehi et al. | 398/82 |
| 2002/0129166 A1 * | 9/2002 | Baxter et al. | 709/246 |
| 2003/0208543 A1 * | 11/2003 | Enete et al. | 709/206 |

* cited by examiner

Each numbered element in a block here represents a router

Each numbered element in this drawing represents a Main Router

61- Condensed Packet

63- Combined header

65 – Real header
(contains mark that this is actually a
condensed packet, and contains the
general target area of the grouped packet)

US 8,073,327 B2

SYSTEM AND METHOD FOR IMPROVING THE EFFICIENCY OF ROUTERS ON THE INTERNET AND/OR CELLULAR NETWORKS AND/OR OTHER NETWORKS AND ALLEVIATING BOTTLENECKS AND OVERLOADS ON THE NETWORK

This patent application is a Continuation-In-Part of U.S. patent application Ser. No. 10/375,208 of Feb. 17, 2003, which is a CIP of U.S. application Ser. No. 10/328,622 of Dec. 26, 2002, hereby incorporated by reference in their entireties, which are a Continuation-In-Part of PCT/IL 01/01042 (which was filed in Israel on Nov. 8, 2001, hereby incorporated by reference in its entirety, which claims priority from Israeli patent application 139559 of Nov. 8, 2000 and from U.S. provisional patent application 60/266,730 of Feb. 5, 2001, and from U.S. provisional patent application 60/299,919 of Jun. 19, 2001, hereby incorporated by reference in their entireties) and which also claim benefit and priorities from the following US Provisional patent applications, hereby incorporated by reference in their entireties:

60/344,455 of Dec. 26, 2001
60/344,652 of Dec. 28, 2001
60/353,781 of Jan. 29, 2002
60/356,554 of Feb. 10, 2002
60/358,231 of Feb. 14, 2002
60/358,202 of Feb. 18, 2002
60/359,555 of Feb. 19, 2002

U.S. patent application Ser. No. 10/375,208 is also a Continuation-In-Part of PCT application PCT/IL 02/01049 of Dec. 29, 2002, hereby incorporated by reference in its entirety, which is also a Continuation-In-Part of the above PCT/IL 01/01042 and which also claims benefit and priorities from the following US Provisional patent applications, hereby incorporated by reference in their entireties:

60/344,652 of Dec. 28, 2001
60/353,781 of Jan. 29, 2002
60/356,554 of Feb. 10, 2002
60/358,231 of Feb. 14, 2002
60/358,202 of Feb. 18, 2002
60/359,555 of Feb. 19, 2002

U.S. patent application Ser. No. 10/375,208 also claims priority from Israeli patent application 149968 of May 31, 2002.

Therefore, priority and benefit is claimed from all of the above mentioned applications, and all of them are hereby incorporated by reference in their entireties.

BACKGROUND OF THE INVENTION

1. Field of the Invention

The present invention relates to router optimizations on the Internet, and more specifically to a system and method for improving the efficiency of routers on the Internet and/or cellular networks and/or other networks and alleviating bottlenecks and overloads on the network.

2. Background

With the current explosion of information transfer, optic fibers are becoming faster all the time. Most of the recent advances in the amounts of data that these fibers can carry per time unit have come from adding more and more wavelengths (termed lambdas) to the same fiber at the same time, a method which is called DWDM (Dense Wave Division Multiplexing). The biggest obstacle to this was the lack of suitable amplifiers, until the Erbium amplifiers were discovered in the late 80's, which have 2 advantages: 1. They don't need to convert the optical signals to electricity and back, but instead, light in the feeble input signals stimulates excited Erbium Atoms to emit more light at the same wavelength, 2. Because they preserve the wavelength of the optical signals, they can amplify many wavelengths simultaneously without having to first extract them separately and then recombine them after amplification. Typically a single optic fiber can carry today up to 80 different lambdas simultaneously, and the number is likely to increase further. As the Internet becomes more and more demanding for bandwidth, optic fibers will keep getting faster at a high rate. The upper limit for optic fibers using such methods is currently estimated to be around 100 terabits per second, and is expected to be achieved within the next 8 years.

However, the biggest bottleneck with such fibers today is the relatively much slower speed of the routers. There are two main methods for routing: circuit routing, and packet switching. In circuit routing, each connection gets a communication route for a certain time slice. This has typically been used until now mainly in telephony, but the big disadvantage is that typical data interactions have a peak 15 times greater than their average rate, so typically on average only 7% of the line is used. In packet switching the same route can be used by many users simultaneously, and the bandwidth is divided between the users by collecting bits together in packets (typically up to 64 Kilobytes per packet in the TCP/IP Internet protocol), and each packet has a header that contains among other things the target IP address of the packet. This way, the route can be utilized up to 100% instead of only 7%. Since the early 70's the computing cost to switch packets has been cheaper and has decreased at a faster rate than the communication speed cost, and this is the reason that the Internet started using packet switching. Today, packet switching is beginning to take over voice as well as data. According a thorough review, "*ATM: Another technological mirage, or why ATM is not the solution*" by Vadim Antonov, published in http://www.inetdevgrp.org/19980421/atm.htm, packet switching or something similar to it is needed not just for better utilization of the lines, but also because it is superior to circuit switching in many ways, such as better scaleability as the Internet grows, better handling of traffic congestions, and better routing flexibility. However, that article also shows that currently the system is incredibly complex and inefficient, with almost infinite router-tables updates having to propagate all the time. Another article, "*Experts sound alarm on Internet Routing*", published on *Light Reading* on Nov. 1, 2000 at http://www.lightreading.com/document.asp?doc_id=2328, shows that the BPG tables (Border Gateway Protocols) are ballooning in size so fast that soon the entire system will crumble and definitely we will need to come up with new and better routing methods. Another thorough study, *Middle Mile Mayhem*, published by the Kellogg Graduate School of Management on the year 2000, at http://www.opnix.products_services/orbit1000/Middle_Mile_Mayhem.pdf, shows that billions of dollars per year are lost due to too slow and congested routers.

On the other hand, recently the ability of optic fibers to carry data has increased faster than the computing power, and the use of DWDM in optic fibers has resulted in routers separating between the lambdas in a way more similar to circuit switching. The start-up company Trellis Photonics for example created and patented a fast router that uses a special crystal that contains holograms and manipulates each lambda to into the wanted output fiber through the appropriate hologram by applying an electrical current to the crystal. Typically this switch has a response time of about 30 nanoseconds, which is among the fastest in the industry today, and can support optic fibers that carry even a few terabits per second (because the switching is done for large groups of bits, not for every bit of information that passes, and there can be time coordination on both sides for circuit switching), and Trellis will probably have soon faster switches with a few nanoseconds response time. Another start-up company—Lynx—claims that it will soon have a faster router that uses, instead of holograms, Lithium Niobate waveguides, which will typically have a response time of about 4-5 nanoseconds.

Even with DWDM, Packet switching is of course still used on the Internet after separating the lambdas, but the biggest problem with packet switching is that the computation requirements for analyzing the packets, finding their target IP addresses, looking them up in the database, and determining their required destination routes, create a severe bottleneck and slow down the process considerably. Translating the information from the light bits into electronic bits for processing in electronic computers and then translating it back to light bits is too much time-consuming. For this reason, there are today a number of companies and university departments who are trying to work in the direction of all-optical switches, which will be able to analyze the information within the data packets directly in the form of light bits, or various hybrid systems that will combine electronics and photonics. According to the thorough review "*Technology: Optical illusions?*", published in http://www.americasnetwork.com/issues/2000issues/20000901/20000901_optical.html, the idea of reading the header separately without disrupting the optical bit stream and using that information to send a control signal to an optical switch has been already suggested in numerous research papers in various scientific journals, starting from the early 90's, but the biggest problems have been the speed of the switching element, and the buffering of the packets. Another good review of such problems is "*Advances in Photonic Packet Switching: An overview*", by Yao et. al., published in IEEE Communications Journal on February 2000, describing for example various complex attempts to synchronize the packets.

SUMMARY OF THE INVENTION

The present invention solves the above problems by working around the synchronization problem, so that the system is able to automatically compensate for the crudeness of the response time of the optical switch (at least a few nanoseconds with the available optical switches described above) compared to the speed of the bits flow. This way the "cutting knife" can be much thicker than the point it has to cut between each two consecutive packets. Obviating the need for synchronization between packets also enables simpler and more flexible buffering, so that the delay lines can even deal with packets of sizes longer than the lengths of the delay lines. The routers read only the headers or parts of them by optically preferably obtrusively marking the target IP addresses or the entire headers or parts of them, or optically preferably obtrusively marking the beginning of each packet header and preferably making sure that the distance in bits between the beginning of the packet and the position of the target IP address is always constant, or marking both. Since the position of the target IP address in the TCP/IP protocol is close to the position of beginning of the packet, it is very easy to find both positions when at least one of them is marked. (In case this distance can change, marking may be done for example for both the beginning of the packet and the position of the target IP address, or some more bits have to be read for finding the exact second position, but this is less efficient. Keeping this distance constant and keeping both positions close to each other is more preferable). So from now on, throughout the text of the patent, including the claims, marking the target IP address means either marking the target address itself directly or marking it indirectly by marking the beginning of the packet header, or marking both, or marking the entire header or part of it, so that in any case this marking also enables us to know the position of the beginning of the packet (See also the glossary for more clarification). If both are marked, the 2 kinds of marks are preferably different, so that for example the beginning of the packet header might be marked by a much longer consecutive period of light (as explained in solution 5 below) than the mark of the target address. This marking is preferably done at the point where the data is entered into each lambda, and is preferably detected after separating the lambdas. The detection is preferably done with the help of a very fast and sensitive photo-diode or photo transistor, which detects the optically obtrusive mark and then preferably extracts only the relevant few bytes that follow it and preferably translates them to electronic bits for processing by electronic computer or computers, preferably with multiple processors. This is much easier and cheaper than having to use a photonic computer, yet very efficient. This way, since a data packet in the current prevalent TCP/IP protocol can typically be as large as 64 Kilobytes, and the target IP address is typically just a few bytes long, by optically marking the location of the Target IP address it can be much more efficiently located by optical means without having to translate all the light bits to electricity or having to process all the light bits in an all-optical processor. So the number of bits that have to be processed this way can be reduced by a factor of 2-3 orders of magnitude. After extracting directly the IP Target addresses and preferably additional data from the header, this data can then be analyzed by the fastest means possible (for example by electronic computers with one or more processors, or by photonic computers when they become available), and then the routing decisions can be immediately transmitted back to the router, which can then act directly on the light packets as for example in the two fast switches of Trellis-Photonics and Lynx, without ever converting them into electricity and back. Since the header is small relative to the packet size, this optical marking can be used also for locating and reading the entire header or additional parts of it, such as for example the packet size.

Since making the packet switching decisions still takes considerably longer than the time it takes the light to pass through the router, preferably the router has an ability to efficiently delay the light data within its circuitry for the number of cycles needed until the packet switching decisions can be made. Another problem is the crudeness of the response time of the optical switch as explained above. A number of solutions to this problem are shown.

Another optimization described in this invention in another possible variation, which is related to the efficient handling of the packets by the routers, is improving routing efficiency and bandwidth utilization efficiency in Networks of interconnected devices such as for example the Internet and cellular networks, by using much more efficiently physical addresses and/or by grouping together identical data packets from the same source going to the same general area so that the body of the packet is sent only once with a multiple list of targets attached to it, to each general target area. This grouping is preferably done by the server of the originating source itself, and is preferably based a physical addresses system, such as for example GPS. These grouped packets are then preferably broken down into smaller groups by the routers in the general target area and finally broken down to individual data packets for delivering to the final actual destinations. This saves both bandwidth and the number of routing decisions needed on the way, since only a single copy of the identical data is sent in each group, and this is why this can be called condensed packets. Another possible variation is that preferably the server can also group together non-identical packets (such as for example packets from different files or a number of different condensed packets of the type described above) going in the same general area, with a combined header or general area tag, although in this case the different packets or groups of condensed packets can not be further condensed to a single copy of the data, so the saving is only on the number of headers that need to be processed along the way for making routing decisions. Such groups of different packets going in the same direction are also then preferably similarly broken down into smaller groups by the routers in the general target area and finally broken down to individual data packets for delivering to the final actual destinations. These optimizations can be very useful for example for optimizing the access to very popular sites such as for example Yahoo or CNN, and can be used also for example for more efficiently transferring streaming data, such as for example from Internet radio stations, or even for example Internet TV stations which will probably exist in the next years, a thing which ordinary proxies cannot do. This can work even more efficiently when it is applied in addition to the current state of the art load distribution systems, such as for example Akamai. The combinations of using both the various physical address optimizations and the separate handling of headers can of course further enhance each other. This is explained in more detail as part of the reference to FIG. 1b.

In other words, the patent has 3 main features, which work best when all 3 are used in combination with each other, but each one of them can be used also independently:

1. Non-blocking packet switching in Optical Routers, by dealing much more efficiently only with the headers, without having to convert the packets to electronics and back, while solving all the relevant problems.
2. New architecture and principles for routing based on physical geographical IP addresses (such as for example based on GPS), in a way much more efficient than has been previously discussed in the literature that suggested using physical (geographical) addresses. This is preferably based on a hierarchical infrastructure of routers—in a way similar to a hierarchical road system, so that routers that are higher in the hierarchy preferably have direct broadband connections with their peers (and preferably also direct links to farther peers), so that they don't have to go through lower level routers to reach their peers. However, conversion from the current architecture to the new one can be done very easy, as shown in the description below.
3. Efficient grouping together of identical or non-identical packets going to the same general area—preferably based on the above physical geographical IP address system, which will enable for example extremely fast streaming video and automatic balancing of loads A number of methods can be used for optically marking the target addresses (and/or the beginning of the packet headers, or the entire headers, or part of them). (The optical detector for detecting these marks will then look for the marks accordingly):

1. One way of implementing this could be to reserve a special lambda just for marking the location of the target addresses (and/or the packet headers or the beginnings of them). In other words, this means that the target IP addresses are marked by a slightly different color. However, this method has the disadvantage of being able to mark the positions only crudely because of the different chromatic dispersion of different lambdas. Another disadvantage is that the packet switching will be typically done after separating the lambdas, so this method of marking requires transferring the special lambda together with each separated lambda or using a new mark for later processing by the packet switching router, unless this processing is done at the same time of separating the lambdas.
2. Solution number 2 is similar to solution number 1, except that instead of one lambda for marking target addresses (and/or the packet headers or the beginnings of them) for all the lambdas passing through the optic fiber, each lambda has its own preferably slight shift in wavelength for marking its own target IP address. However this wastes more wavelengths and more problems of crosstalk between close wavelengths may occur.
3. Solution number 3 does not use any change in color (wavelength) for marking the target addresses (and/or the packet headers or the beginnings of them), but instead uses a conspicuous change in light amplitude, preferably a significant increase in the amplitude for all the bits of the target IP address and/or all the bits of the header or part of it. However, since optical fibers typically need amplifiers at certain intervals, and some of them may not support keeping the different levels of amplitude, this solution might require changing amplifiers.
4. Solution number 4 does not use any change in color (wavelength) for marking the target addresses (and/or the packet headers or the beginnings of them), but instead uses a temporal method of marking it, which is much cheaper and easier to create and also easier to detect later. Preferably, this can be easily done by simply marking the position of the target IP address with a period of no light considerably longer than ordinary. Preferably, This considerably longer period is at the beginning of the packet and the exact position of the target IP address is defined by a slight shift from there or marked separately.
5. Solution number 5 is very similar to solution number 4, except that instead of an easily noticeable period of no light, it uses an easily noticeable period of consecutive light. Preferably, in addition to this, the period of consecutive light can also use significantly higher intensity, in order to make the mark even more conspicuous. Preferably, This considerably longer period is at the beginning of the packet and the exact position of the target IP address is defined by a slight shift from there or marked separately.
6. Solution number 6 is to use a different polarization for marking the target addresses (and/or the packet headers or the beginnings of them), which is also cheap and easy to create and also easy to detect later. So the detector in this case is a polarization detector, preferably tuned especially to the different polarization. Of course, various combinations of methods 5 and 6 and/or of the other solutions can also be used. Another variation of this solution is to use alternating polarizations for each two consecutive packets in the lambda bit stream, so that for example all the odd packets have one polarization and all the even packets have another polarization. However, such alteration between odd and even packets is problematic and less desirable because after the routing the order of packets can change, so it would require additional mechanisms for shifting again the polarizations at the router or adding a dummy packet when required, to keep the alteration rule working. Also, this can work only with polarization retaining fibers, which are more expensive.

7. Solution number 7 in to synchronize the wave phases of the various lambdas and use time shifting of the waves of the different lambdas for the marks, while taking into account also the differences in wavelengths, so the detector in this case is a phase detector. However, this solution is impractical in long-distance fibers because of dispersion problems.

8. Solution number 8 is using for the mark a temporally different kind of bits, for example fatter bits. So, for example, if normal 1's are 20 picometers wide and 0's are 10 picometers wide, the marks can use for example 1's that are 60 picometers wide and 0's that are 30 picometers wide. The proportional change of 0's and 1's does not have to be the same, and also the width of the separator between bits can be either also changed or not changed. (Of course this is just an example and 0's can be for example the same temporal width as 1's but identified by different light intensity levels, etc.) This solution is in a way a combination of solutions 4 and 5 and it is better than them because it enables the mark to carry also information, and also avoids problems such as a dark mark being the same as a period of a silence in transmission. This mark of fat bits can be for example in front of the packet header, but preferably the entire packet header itself or at least parts of it (such as for example the target address) are encoded or duplicated in fat bits. This enables easier handling of the header even if the bit stream is extremely fast. Of course various combinations of the solutions are also possible, such as for example a longer consecutive period of darkness or light before the beginning of the fat bits of the header.

IMPORTANT CLARIFICATION AND GLOSSARY

Throughout the patent when possible variations are mentioned, it is also possible to use combinations of these variations or of elements in them, and when combinations are used, it is also possible to use at least some elements in them separately or in other combinations. These variations are preferably in different embodiments. In other words: certain features of the invention, which are described in the context of separate embodiments, may also be provided in combination in a single embodiment. Conversely, various features of the invention, which are described in the context of a single embodiment, may also be provided separately or in any suitable subcombination. All these drawings are just exemplary diagrams. They should not be interpreted as literal positioning, shapes, angles, or sizes of the various elements. When used throughout the text of this patent, including the claims, "database" means either database or databases. When used throughout the text of this patent, including the claims, "computer" means either computer or computers, and can mean any kind of computer, such as for example electronic or photonic, with a single processor or multiple processors. "TCP/IP" stands for "Transmission Control Protocol/Internet Protocol. "IP Address" stands for "Internet Protocol Address". However, throughout this patent, including the claims, this address is used as a logical concept and does not necessarily depend on a specific implementation, so the concepts of this patent can work with any implementation or kind of target address. Even though there are actually 7 layers of communication, we are concentrating on the target address as a logical concept regardless of other layers. Since our optical marking would be typically categorized as layer 1, which is the physical layer, layer 2, which provides error control, must be able to ignore our marks or avoid being confused by them. If some more data needs to be read for example from layer 2, it can still be done within the scope of the present invention by adding for example a few more optical marks if necessary. Also, for example the protocol of the first 3 layers can be modified between the routers that comply with this invention in order to make the marking easier to implement. Also, even though we described the invention with reference to DWDM, it will be appreciated that the present invention can work similarly also with other means of multiplexing that may be used in the future. Although physical (geographical) addresses are described mainly with the example of GPS, other geographical or coordinate-based methods can also be used, so throughout the patent, including the claims, wherever GPS is mentioned it can be also any other system of determining physical location.

DETAILED DESCRIPTION OF THE PREFERRED EMBODIMENTS

All of the descriptions in this and other sections are intended to be illustrative examples and not limiting.

Figure 1:
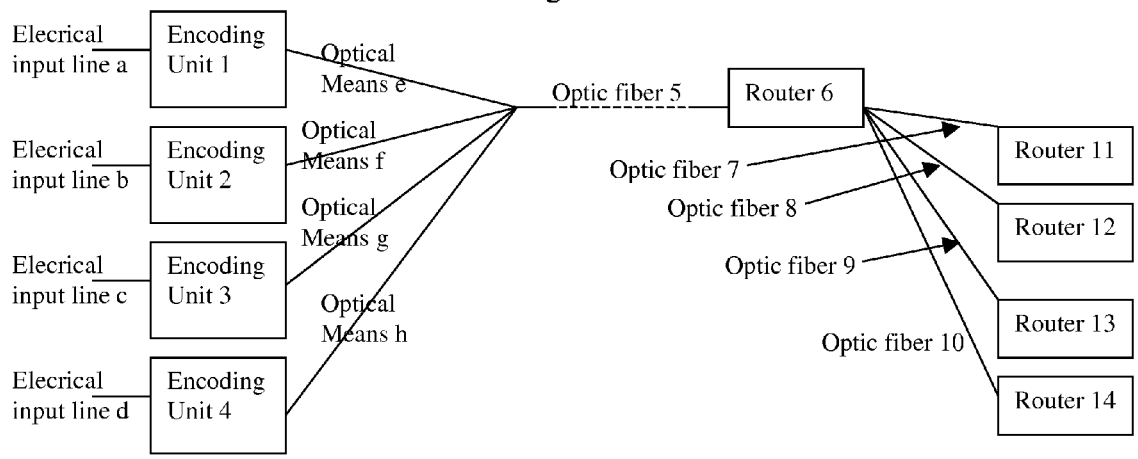
FIG. 1 is a schematic illustration of a preferable exemplary configuration of the system.

Referring to FIG. 1, we are assuming for the simplicity and clarity of the example, that there are only 4 lambdas carried simultaneously by the optic fiber. So there are 4 units (marked 1-4) that encode electrical bits from electrical input lines (marked a-d) respectively into the light bits of each lambda, and while encoding them, these units preferably find the target address of each data packet and/or the beginning of the packet header and mark them with an optically obtrusive mark, or mark the entire header, so that the computer that makes the packet switching decisions will get the entire header. Preferably the target address is very close to the beginning of the packet and at a constant distance from it, so only one mark is needed for each packet. Most preferably the target address would be the first thing at the beginning of the header. Unfortunately, according to current Internet protocol, although the header is indeed very small (At most 60 bytes long), this distance is not constant: Even though the typical header length is 20 bytes, this length can change between 20 to 60 bytes, and the target IP address is near the end of the header, so one solution is the read most or all of the header. Another possible solution is to change the protocol at least within the system of routers that conform to this invention, so that preferably the target address is moved or copied also to the beginning of the packet before the normal packet header begins, and before exiting the system this can be changed back to the original header structure. An even better solution is to do some IP address processing in advance and put, preferably in front of the packet header, a label that defines already the general destination of the packet, similar to the way that postal services look first of all at the destination country. Such a system can save processing time for the computers that make the packet switching decisions in each router, and we want to make this decision time as fast as possible, so that the optical delay circuit can be made as short as possible. Also, it should be emphasized that the present invention enables a good flexibility in the amount of address processing done by the router, so that for example the main junctions can rely more on the pre-processed labels (or on various levels of pre-processing), and other routers closer to the targets, who eventually have to deal with the exact address, can still do it much faster than it is done today. In the next generation Internet that will take over in the next few years, this will work even better, because: a. the next generation headers are going to be of constant size, b. the IP address size will increase and will probably contain also information that will help to determine better and faster in advance the physical location of the Target, so both the pre-processing of the addresses in advance and the processing at the router will be able to work faster. So the physical location info might include for example the GPS coordinates of the target and the origin, or longitude and latitude coordinates, or geographical info such as for example state and town (for example as separate numerical fields within the address) and therefore, preferably the routers also know their own geographical location and also the geographical location of all the other major routers in the Internet or at least of the routers that are directly connected to them (coordinates, and especially GPS coordinates are better because the calculation is immediate without a need for maps). This way, almost no routing tables (or no routing tables at all) of the type that is used today are needed and even without any pre-processing the decision making per each address can be almost instantaneous. For example each router can decide to forward a packet to another router simply if that router's physical coordinates are closer to the physical address than itself and preferably chooses from the routers connected to itself the router closest to the target. This way, preferably for example the entire routing process might be done without the need to rewrite any labels on the way. However, for increased efficiency, preferably each router knows in addition to the geographical location of the other main routers (or at least the routers that are directly connected to it), also their connectivity (for example in map or table or graph form), which shows which routers are connected to which, and preferably also the bandwidth of each connection and/or for example relative load on each connection, and/or for example average free bandwidth and/or more precisely what physical area is covered by each of these routers, etc. Preferably, for maximum efficiency, the main routers are spread properly and more or less evenly around the Internet and with sufficient connectivity between them, so that at least in regard to the MAIN routers, preferably the above additional data is preferably needed and used more as an exception in extreme cases than as a rule, however their spread might also be based in addition or instead for example on countries and/or on the number of network-connected devices in each area and/or on known zip codes and/or on phone number prefixes, or any combination of the above, etc. Preferably each router normally makes its decisions mainly by choosing the router whose physical coordinate are closest to the target, and preferably takes into consideration other data, such as for example connectivity and/or bandwidth and/or current load for example only if two or more routers are almost the same distance from the target (within a certain margin) or if there are specific problems such as for example certain routers falling down or becoming overloaded beyond a certain threshold. This way, maximum efficiency can be used for most routing decisions, and still higher flexibility can be achieved when the need for that arises. In these variations preferably the router can either choose the directly connected router (neighboring router) that is physically closest to the target (or one of the group that is closest), or choose one of the MAIN routers that are closest to the target area (such as for example routers 43, 44 and 45 in FIG. 1b). (In the first case, if the router does not find a directly connected router that is closer to the target than itself, preferably it uses the second case). In the second case the assumption is made that each of the major routers is properly connected to many small routers in its area and will know how to further deal efficiently with packets sent to its area. For example, there can be a few dozens or a few hundreds of such major routers around the Internet, each connected for example to hundreds or thousands of smaller routers in its area. When choosing the closest MAIN router, again, there are a number of possible variations: For example (unless it is within its own general area) the router can regard the MAIN routers as the only relevant routers and choose on each step one of the neighboring MAIN routers that is physically closest in the direction of the target, and then use any of a number of possible routes that it knows best in advance for reaching that neighboring MAIN router directly or by any of the smaller routers that connect between them. So in this variation each router preferably has already in its memory a list of best next possible hops or even best complete routes for reaching each of its neighboring MAIN routers. Another variation is that each MAIN router preferably chooses as the target the MAIN router or one of the MAIN routers that is closest to the target area out of all the MAIN routers on the internet, and if for example there are a few hundreds such MAIN routers, then each MAIN router preferably has for each such MAIN router a list of best next possible hops or a list of best next neighboring MAIN routers for reaching the final destination MAIN router. However, the first of these last two variations is more preferable, since assuming proper connectivity between the MAIN routers, it is sufficient to reach one of the MAIN routers that is closer to the direction of the target area, and assume that it will know best what to do next. On the other hand, the second variation automatically avoids any loops, and can also work very efficiently if each of the MAIN routers has in advance lists of possible best next hop or hops (so that for examples if the next best hop is unavailable there are already known alternatives in advance) or even best complete routes for reaching any of the other MAIN routers. In this case the MAIN router can for example also add to the packet (or to a group of packets, as described in the reference to FIG. 1b) the identification of the next desired MAIN router, assuming that the small routers on the way are supposed to know in advance how to reach it or add a mode detailed route of how to reach it (or even add in advance the route by listing all the MAIN routers that are on the way, but that is less efficient). In other words, in order to be able to efficiently route a packet, all you need to do is find which of the MAIN routers on the net is (or are) physically closest to it (which is instantaneous, based on the coordinates), and to have in advance the knowledge of how to reach each of the for example a few hundred MAIN routers. In the above variations, smaller routers (that are not considered to be one of the MAIN routers) can for example make their forwarding decisions in a similar way to the way that the main routers do, or for example forward packets that are going outside of the general area served by the MAIN router which covers their area to that MAIN router (or for example the next best MAIN router if the best one has fallen or for example to other nearby MAIN routers) and let that MAIN router make the routing decision for such packets. This means that preferably each small router also has constantly in advance a list of one or more best next possible hops or even best complete routes to at least one of the MAIN routers closest to it (preferably at least to all its neighboring MAIN routers, or even to all the MAIN routers), so it knows how to reach them without having to make any routing decisions. (However, a choice of next best hops is sufficient, assuming that all the other routers also know the next best hop or hops to the MAIN router in their area, but if they don't know, then another possible variation is that the full route is forwarded to them, but that would be of course much less efficient). Of course, this is just an example of using a 2-level hierarchy, and actually there can be more than two levels, such as for example using also one or more levels of intermediate-level routers between small routers and MAIN routers. Preferably the higher a router is on the hierarchy, it also has more bandwidth associated with it, or at least above a preferable minimum. Another more preferable variation is that the MAIN routers (and/or intermediary-level routers) are preferably also connected directly with high-bandwidth as peers between each other (at least each one to its more close neighbors, but preferably with many redundancies and preferably connected directly also to remoter peers who are at least up to a few hops away, which further increases efficiency and increases robustness if a MAIN router falls for any reason, as shown for example in FIG. 1c) without having to go through lower-level routers in order to reach their peers, so that once a higher-level router (and especially if its one of the MAIN routers) decides to forward a packet (or a group of packets) to a higher-level peer, preferably the packets don't have to go through lower level routers. This can automatically increase the likelihood of having higher bandwidth to the next peer and automatically reduce the number of routing decisions needed in order to reach the next peer. This is similar to a hierarchical road-system, where for traveling for example between large towns broad highways with few or no junctures are used, and intermediate and smaller roads and streets with much more junctures are only used for finding the more exact address within each area. And like driving in the real world, for example when someone is in one town and knows that he has to travel to another town, he does not keep looking at each small juncture of each street where is the next street that goes in the right direction, but instead he immediately finds how to get to the inter-urban highway that will lead him directly to the other town with almost no junctures on the way. This is very different from the current state of the art in routers, which is much more similar to looking each time for the next juncture without being able to take advantage of a useful hierarchy. Preferably, at least some MAIN routers have broadband direct links also to farther MAIN routers and/or even to MAIN routers at the other end of the Internet, so that even longest-distance routing can be done with a minimal number of hops. In other words, if the Internet architecture is designed or redesigned in advance in a smarter manner, the making of routing decisions can become as simple and as fast as possible. An example of a small part of such a hierarchy is shown for example in FIG. 1b. (Another possible variation is to put more than one MAIN router at each central position, so that they back-up each other, and/or enable the closest routers of 1-level below in the hierarchy to automatically assume the functions of a MAIN router if it was disabled until the problem is fixed). However, for making the transition to this architecture more efficient, preferably the current structure of backbones and higher bandwidth connections will be used for automatically defining or helping to create at least part of the desired hierarchy structure, since it is reasonable that this already reflects the need for higher bandwidth where it exists. So preferably this can be determined for example by automatic statistical analysis, and after this initial structure is analyzed and the geographical position of each router (or at least of the more significant routers) is specified, a basic geographical hierarchy can be automatically defined according to this, and then later improved for achieving better optimizations, for example by finding and deciding where more connections and/or more bandwidth are needed and adding them accordingly, and deciding for example where more MAIN routers are needed, and preferably adding for example bandwidth and more direct connections to routers that are chosen to become MAIN routers. Such analysis can be very useful also for other purposes and can be preferably automatically repeated often, for example for getting constant follow-ups over the growth of the net and the connectivity of various parts of it and for example for locating and fixing weak links or vulnerable junctions in advance. In order to further facilitate the conversion into the above described hierarchies, and since the net currently contains many interconnected independent networks that are connected between them on borders called NAPs (Network Access Points), which are very problematic junctures, instead or in addition to such border connections which are at the edges between these networks, preferably, where needed, one or more MAIN routers with high broadband direct contacts to their peers at other networks will be added at the center or centers of each important network, preferably while taking into consideration also the area each such network covers, and preferably also more direct links will be added along the borders between such networks, which is much easier according to the teachings of the present invention, since there is no more need for complex routing tables at these borders. Similar hierarchies and principles are preferably used also with wireless networks and/or for example with other types of networks that might exist in the future. Another possible variation is to add to the packet header for example also a label naming the desired final MAIN router at the general target area. Preferably the routers also use various heuristics for preventing endless loops, for example by avoiding sending a packet back to the router who sent it (and/or by collecting the list of traversed routers or main routers as a cumulative list added to the packet header, however that is less efficient). However, the above principles of looking for example for the next best MAIN router (normally, or only if there is no closer directly connected router) or looking directly for the final MAIN router closest to the target, should solve this problem anyway. These heuristics are much more efficient than variations that try at each hop to mathematically compute the next shortest path, such as those described for example in the article by J. C. Navas & T. Imielinksi, "*On reducing the computational cost of geographic routing*" published on Jan. 24, 2000, at http://www.c-s.rutgers.edu/~navas/dataman/papers/dcs-tr-408.pdf. Preferably, the physical addresses, such as for example GPS, can also be combined with some additional non-physical codes, so that for example if there are a number of computers in the same room or building (and especially if they are on top of each other), the additional code can distinguish between more than one computer that have the same GPS coordinates or between devices that are considered to be within a small-enough area according to certain thresholds (for example a few meters, a few hundred meters, few kilometers, or based also on the density of network-connected devices per area, for example each group of closely spaced dozens or hundreds of devices can share one set of physical coordinates). In this case preferably only the closest routers or gateways next to these computers or these computers themselves (or other devices that are connected to the network) need to carry for example a local table with data that differentiates between devices that have exactly the same GPS (or are within the thresholds that define a single area), or use a local small routing-table system similar to what is being used today globally on the Internet. (Preferably the coordinates can include also height, so that devices will have the same GPS only if the computers or devices are really very close). However, for this to work properly and efficiently, preferably each device or at least each smallest area-unit according to the thresholds, is preferably connected directly to the routers that are closest to it physically (instead of indirectly through a farther router). Another possible variation is for example that this is assumed to be the rule, and the routers indicate if they don't cover a certain area that they were supposed to cover normally, only as an exception. Another possible variation is for example that only the main routers use the physical addresses and within each smaller area the smaller routers either continue to use physical addresses up to smaller areas (for example as defined above), or use a local routing-table system similar to what is being used today globally on the Internet. (This can be equivalent to using for example a known list or table of MAIN routers for packet forwarding and/or using for example an identification of the closest MAIN router as part of the IP address. However, in such a case, since MAIN routers can fall or be changed or nearby routers can be added, such changes would require global updates of the involved IP addresses, so preferably the Identification of the MAIN router actually contains information about its area, so that any other MAIN routers that are added nearby preferably also assume the same or similar identification. Therefore, it is clear that this is much more efficient if at least each MAIN router's area is known, which means that practically physical addresses are used. On the other hand, if there are for example just 100 or a few hundred MAIN routers on the entire Internet, then changes in them would be rare and thus making global updates of IP addresses that contain as part of the address reference to the changed MAIN router would not be a big problem. In another variation, if the MAIN router is not included in the IP address, it might still be possible to take advantage of such a hierarchy at least partially also without knowing the physical locations, if for example routing tables are exchanged only or mainly between peers of the same level of the hierarchy, so that for example only the MAIN routers have to exchange global data between them. But in such a case preferably each MAIN routers has a list of all the lower level routers in its area and can supply it to its same-level peers, and preferably each lower router has knowledge of the hierarchy above it). This can enable rapid transition to the use of physical addresses even before all the routers support this. In this case, one possible variation is that normal network-connected devices have a cruder physical address (even though they are stationary, for example depending on the size of the smaller local areas), however more preferably they still have a normal GPS apart from their non-physical address, so that the local routers can later start using physical-addresses in even smaller local areas without the need for changing the physical addresses of the devices in these areas to more precise ones. Also, preferably, in all of the above variations the devices have a normal IP address (of Ipv4 or Ipv6 or whatever other version will be used) in addition to the physical address, in order to be backward compatible with elements in the Internet that still do not deal properly with Physical addresses—at least for a transition period until a sufficient number of routers support the routing by physical addresses. If the physical location of the target or the source changes, including for example in the case of mobile Internet-enabled phones and portable wirelessly connected computers and/or other devices that might be connected in the future to the Internet (such as for example smart home or office gadgets, etc.), then preferably they can immediately determine their own GPS and update it in the appropriate extension of their IP address, or if they don't know it, then preferably they are automatically informed of it and update this field, for example by the first GPS aware router or cellular company's cell or cells that know that they are close to them. Therefore, preferably, all the cells of all the cellular companies should also be constantly aware of their own GPS. However, since the IP address of each Internet-connected device must be updated over Domain Name Servers in the Internet when it changes, for efficiency considerations preferably there are different codes for typically mobile devices and typically stationary devices, so that since stationary device change their GPS only rarely, preferably their GPS is updated globally in the DNS system when they change location, whereas mobile devices preferably have only a cruder GPS covering only their general area (or their state or country for example), and when they move beyond a certain minimal significant distance within their general area, preferably they update only the nearest cells (or are updated by the nearest cells) about their new GPS location so these changes do not propagate over the Internet but only locally. In this case preferably their crude GPS changes only when they move beyond their crude general area. (However, the decision making might still have to take into account some knowledge about the current loads and/or accessibility and/or bandwidth of the other main routers, so preferably at least when needed such data is updated all the time at the decision making computers at the routers). Of course various combinations of the above variations are also possible.

Another possible variation is to make additional pre-processing that groups together packets that are going to the same general area, and use a general destination tag for the entire group, and then preferably the group of packets can be treated by the routers of the main junctions like a single packet and treated as individual packets at the routers closer to the target. Also, preferably, packets that are smaller than a certain minimum are padded with extra trailing bits to reach a required minimum size (The need for this is explained below in the ref. to FIG. 2). Anyway, if the bit rate is very high, preferably these changes are done previously and these marks are also done previously electronically (such as for example by higher voltage or noticeable consecutive period of constant voltage) so that no computational processing of the data will be needed at this stage. These lambdas are then condensed through optical means (marked e-h) into the same optic fiber (5) and travel typically a large distance. It should be noticed that typically there are more than one optical fiber in each physical optic fibers bundle, so everything is multiplied by the number of actual fibers. Typically there are also amplifiers at certain intervals for keeping the optical signals strong enough. Eventually the optic fiber reaches the first router (6), which is preferably a fast optic router such as for example the routers developed by Trellis-Photonics or Lynx or other demultiplexers, for separating the lambdas each into a different target optic fiber (marked by 7-10). These optic fibers then each reach the packet switching router (marked 11-14) that works much more efficiently by optically detecting the marked target IP addresses. It should be emphasized that although this is a typical configuration today (of course with much more lambdas and much more optic fibers in each bundle), many changes in this configuration can be made in the future. The distance between the first router (6) that separates the lambdas to the packet switching routers (7, 8, 9, or 10) can be any distance, from near to far.

However configurations can also be conceived in which the fast packet switching is used even before separating the lambdas, for example if we start making much larger packets (such as for example for demanding visual communications), or making additional pre-processing that groups together packets that are going to the same general area, and using a general destination tag for the entire group. This way, the whole group of lambdas or subgroups of them can behave like a single channel with packet switching, but in this case preferably additional controls are used to ensure synchronization between the lambdas, such as for example marking the starting points of the packet headers in each lambda with long consecutive marks, so that only one header needs to be interpreted but the exact position can be determined for each lambda. Other variations are also possible, such as for example using a number of subsets of lambdas each as a single channel with packet switching. Since the propagation delay variation for example between lambdas 30 nanometers apart can be around 60 nanoseconds after traveling a 100 Kilometers, or about 6 nano if dispersion compensation fibers are used, then for example after traveling 7,000 km for example in a submarine cable, the delay variation will be 4200 nano, or 420 nano if dispersion compensation fibers are used. Therefore, for example with a typical frequency of 10 Gigabits per second for each lambda at the current state-of-the-art broadcast rates, about 10 bits per nanosecond are passing in each lambda at a given point on the fiber, so this can cause a deviation of 4,200 bits=525 Bytes between the lambdas that are 30 nm apart. This means that if we use more than one lambda as a single channel, preferably subsets of lambdas closer to each other are used, and/or the length of the long marker is preferably for example at least a few thousands of bits long. Another possible solution is to use the method of duplicating the bit stream (explained below in the ref. to FIG. 2) and making sure that each packet is at least long enough so that we have a long enough slack area. This way, the router need only look at one of the headers, preferably the header of the fastest lambda, for making the routing decisions, and the exact positions of the headers of the other lambdas need to be determined only at the destination or for example at routers at the periphery which have to convert it to electronic signals for the non-optical peripheral part of the network. Another possible variation of this is that preferably the slowest lambda in the group is also extracted, in order to find the size of the gap between it and the fastest lambda in the group in order to make sure that the slack area is within limits. Another possible solution in this case is to separate the lambdas at the router (or for example only the most divergent ones) and determine the starting position of each lambda's header at the router, but use only the first header that comes in (preferably the one from the fastest lambda) for making the packet-switching decision, and then applying the same routing decision to all the lambdas in the group. Of course, various combinations of these solutions can also be used. In the other direction—another possible variation is for example to regard more than one optic fiber as a single channel for packet switching, but, again, in such a case additional controls may be needed to ensure synchronization between the lambdas in each fiber and between the fibers that are used as one channel. Preferably, in such a case, the delay circuit can contain for example more than one fiber in parallel, or a number of delay circuits can be used in parallel—one for each fiber, but the packet switching decision made for one of the fibers would be applied automatically to all the fibers that belong to the same subset. (In this case, if other temporary optical storage method or methods are used, the data from more than one fiber is preferably similarly stored together or in parallel). It is also possible, for example, to optically duplicate the entire group of lambdas entering the router into as many copies as needed, and then various combinations of decisions can be made based both on separating lambdas and on packet switching or other combinations of various kinds of mixed protocols. Another possible variation is to add also for example something like an automatic cache memory to the router, so that, since usually a number of packets belonging to the same communication may reach the router within a short time interval, the router can remember and use the same routing decision for other packets that are going to the same target (and/or for example to the same general area, if physical addresses are used). This and other features can also be used independently of the other features of this invention.

Figure 1B:
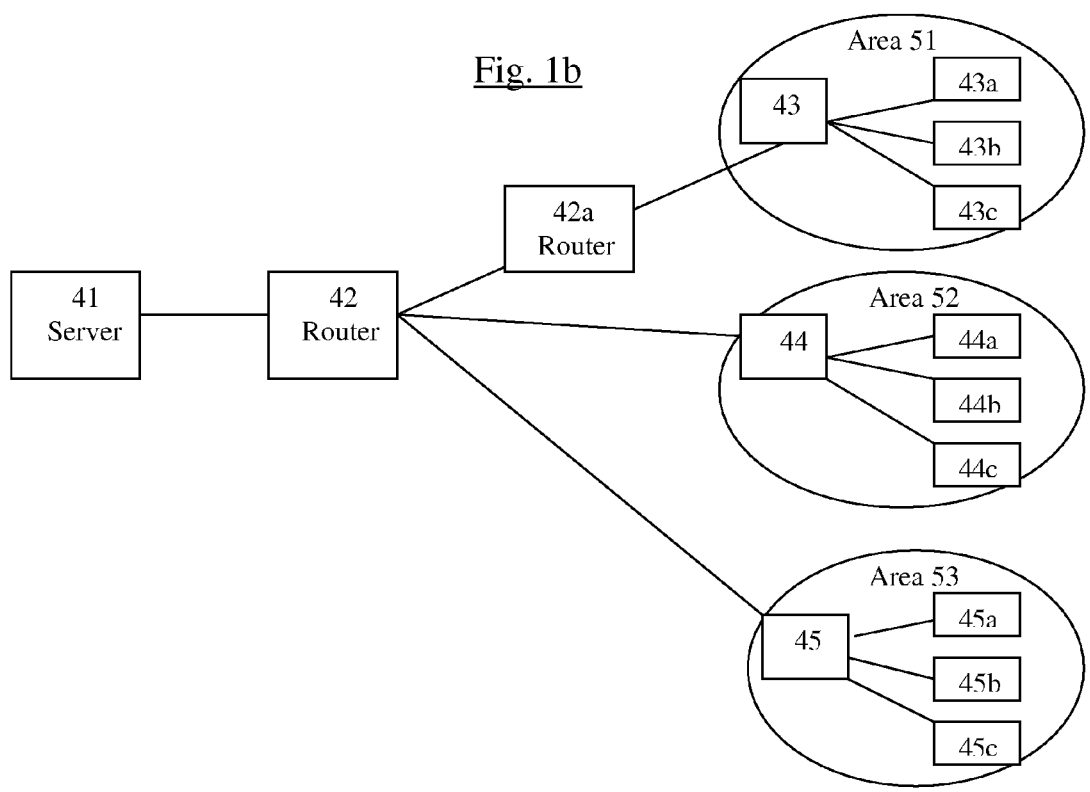
FIG. 1b is a schematic illustration of a preferable example of grouping together identical data packets from the same source going to the same general area with a multiple list of targets connected to each copy of the data and sent together to the general target area.

Referring to FIG. 1*b*, we show in another possible variation, a preferable optimization of making additional pre-processing that automatically checks and identifies packets of identical data if they are coming from the same Internet page (for example from server 41) and going to the same general area (for example area 51) (for example within a small pre-defined time window) and can group them together so that the body of the data is sent only once and for example the first part of the packet for example has a special additional data part that contains the actual list of targets. (Preferably in one of the possible embodiments this special part can also be marked differently optically, for example with fat bits, in order to make it easier for the router to read and rewrite this part on the fly as needed, but in this case preferably these bits are less fat than the bits of the real packet header, in order to avoid confusion. Another variation is using normal bits for this data). In this case preferably there is a special mark in the header that tells the routers on the way (for example router 42*a*) that this packet is actually a condensation of more than one identical data packet. As the condensed packet reaches the general area (for example area 51), it is preferably separated back by duplicating into separate packets, each with its original target restored in the header, or, in another variation, separated into similar grouped packets but with a smaller number of targets and a more precise general united target area, and further distributed from there (for example by routers 41*a-c*), and later broken down into the individual packets. This saves both bandwidth and the number of routing decisions needed on the way, since only a single copy of the identical data is sent in each group, and this is why this can be called condensed packets. Of course this grouping and ungrouping according to destination areas can be only done efficiently in the next generation Internet, by using the physical part of the address, preferably GPS coordinates. Preferably, the physical address system is implemented as described in the reference to FIG. 1. Preferably, the decision when to break down the packets into smaller groups or into individual packets can be done for example as a simple function of the amount of distance between the target area's physical coordinates and the router's physical coordinates, or the router for example decides to break up a group if there are no other main routers with coordinates closer to the coordinates of the general target area. (Another possible variation is to take into consideration for example also the connectivity and/or bandwidth and/or current loads of various routes at the time of making the decision, as defined already in the reference to FIG. 1). For the actual breaking-up, in electrical routers there is no problem to manipulate the data, and in optical routers preferably the extended header (that contains also the list of targets) is preferably read along with the real header for processing, and then for breaking up the grouped packets, they are preferably optically duplicated and the new headers inserted for each sub-group or individual packet created. (However, in the meantime until the physical address system becomes available, it can be done, preferably in another embodiment, although less efficiently, by using for example trace-route information of the request for the data, so that packets are grouped together based on the routers through which the request for the data traveled or originated. For this purpose, packets that travel on the Internet, or preferably at least for example the small packets of requests for data typically generated by Internet browsers, can for example accumulate along the way the list of the routers through which the request passed and deliver this information to the server, and so when sending back the data, the server can for example automatically regard requests as belonging to the same general area by identifying common routers in their lists of traversed routers). This can be very useful for example for optimizing the access to very popular sites such as for example Yahoo or CNN (or for example sites such as for example large legal MP3 sites, legal online movie sites, large shareware sites, etc.), in a way similar to a caching proxy, except that it can be done automatically even when the user does not work through a specific proxy. However, this is even more useful than ordinary proxies since it can be used also for example for more efficiently transferring streaming data, such as for example from Internet radio stations, large-scale e-learning classrooms or video conferences, or even for example Internet TV stations which will probably exist in the next years, a thing which ordinary proxies cannot do. However, comparing the data of packets if their header says that they come from the same source and go to the same general target area in order to see if their data is identical is not efficient, so preferably this packing together of same packets with multiple targets is done already by the server itself (41) (This can be for example an additional protocol that sits on the normal TCP/IP or for example UDP or other protocol for example by using part of the united data packet as an extended part of the header which contains the list of actual target addresses). This way, the server (41) can either send only one copy of each data packet with all the list of target addresses included, to the nearest router or MAIN router (for example 42) that can handle it, or more preferably for example prepare a number of separate copies each already grouped by at least some level of general division of areas. So for example if the site is an Internet Radio or TV station, and for example there are 100,000 people in Israel who want to view it at the same time, the same streaming data can be automatically sent to Israel (51) just once, and automatically divided into targets by the routers (41a-41c) in Israel. (So if Israel is for example the general target area (51), until the combined packet reaches this area, all the routers on the way don't have to look at all at the packed list of targets). Preferably in this case much larger packets sizes can also be used, in order to further increase the efficiency of handling the distribution, especially if the list of targets is so large, so that preferably the header is still much smaller than the actual data part of the packet. With the aid of an additional slight variation this can be even used for example for very efficient video-on-demand or radio-on-demand, by having for example a number of sub-parts in the Internet radio or TV stations, so that each sub-part has different transmission times for example with jumps of 10 minutes between them, so that the user for example does not need to wait more than 10 minutes for viewing a certain choice of movies. Of course, as the Internet becomes faster, the transmission speed can be much faster than the actual movie time, so for example the entire movie can be broadcast in a few minutes or even seconds, which would make the idea of waiting for example 10 minutes obsolete, so the waiting will be mainly just for filling the preferably short time window so that the server can gather enough target addresses for packing the packets together. (However, the transmission speed is for example limited when broadcasting live from an Internet TV station). Another possible variation is that streaming data such as for example TV or radio broadcast or e-learning broadcast or video conference over the Internet will have a special status, so that the server can easily keep a list of hooked "audiences" (for example by assuming a certain minimum time of attendance) in order to be able to more efficiently use the same list of target addresses for multiple packets. This is somewhat similar to the way that e-mail with multiple addressees is currently handled, except that it is much more efficient in grouping and ungrouping according to general destination areas (since in the current state-of the-art the POP mail server practically sends together only e-mails that are going to the same domain), and it can be applied to many types of data, in addition to e-mails. This means of course that apart for more efficient access to popular sites and for example more efficient Internet TV or radio stations, this can be used for example also for sending much more efficiently automatic software updates or patches for example for programs (such as for example the large browsers), much more efficient automatic pushing or distribution of various data (including for example electronic versions of newspapers, collected information according to subjects of interest, automatic selections of media information according to interests, etc.) for example to groups of subscribers (for example on the Internet and/or to cellular phones or mobile computers over cellular networks), more efficient propagation of Internet Newsgroups data or any other data between servers, including for example the propagation of the DNS (Domain Name System) tables (the tables that link between domain names and the numerical addresses), etc. By sending out the data to everyone at the same time the efficiency is made even higher because it takes advantage of the optimization to the fullest. This way Internet high loads can be handled much more efficiently, and it has very high scaleability, so that even huge overloads on a single site are automatically handled extremely efficiently by using the very fact that the site is requested by a large number of users in order to send out the data much more efficiently. At least in some aspects, this may work also more efficiently than load distribution systems such as for example Akamai, or at least further improve them when applied in addition to them, because: A. These systems cover only part of the route from the server to the target, whereas the new system and method described here can extend automatically longer along the route. B. These system are limited to a finite number of predefined areas where additional servers are positioned, whereas the new system and method is automatically much more dynamic. C. These systems cannot handle dynamic data at present because of synchronization problems, whereas the new system and method can. D. Systems such as for example Akamai help only a set of servers who specifically request the service and pay for it, whereas the new system and method can work automatically for any server that supports it. Of course it can work even more efficiently when it is applied in addition to the current state of the art load distribution systems, such as for example Akamai. Also, preferably load distribution systems like Akamai and/or various caching systems will be optimized by placing mirror servers and/or proxies especially at close proximity to the MAIN routers and preferably also near to lower-level central routers on the hierarchies. Another preferably improvement is that when updates are initiated from the source of the data to the mirror sites, they are preferably distributed to all of them at the same time, thus automatically utilizing the optimization of routing together packets going to the same general areas or directions. A further variation of this is that data such as for example streaming audio and streaming video (such as for example from internet TV stations) can also preferably be constantly updated this way between the origin of the data to the main centers and/or sub-centers even before any user asks for them. Another possible variation is that when combining the new system with load distribution systems like Akamai (and especially when broadcasting streaming data such as for example video or TV), preferably the load distribution systems try to keep the users as much as possible on the same server after assigning the closest server to them, without unnecessary switching between servers according to load, in order to enable more consistency in sending the data to the same hooked audiences. This is also easier to accomplish because the new system automatically reduces the load anyway without needing to continuously move users around servers according to load. Another possible variation is that when downloading for example very large files, such as for example large video files (such as for example popular movies or movie trailers), MP3 files, popular software files, etc., the server can combine together in the united packets also requests that came after the original time window, so that for example new requests might be combined with older requests and thus get first a later part of the file and then get earlier parts of the file later. Another possible variation is that preferably the server (and/or routers along the way) can also group together non-identical packets (such as for example packets from different sources or a number of different condensed packets of the type described above) going in the same general area with a combined header or general area tag, although in this case the different packets or groups of condensed packets can not be further condensed to a single copy of the data, so the saving is only on the number of headers that need to be processed along the way for making routing decisions. Such groups of different packets going in the same direction are also then preferably similarly (like in the mechanism described above) broken down into smaller groups by the routers in the general target area and finally broken down to individual data packets for delivering to the final actual destinations. So this can be considered an improvement of current MPLS (Multiple Protocol Label systems). Another possible variation is to use, preferably in addition to the above described options, also proxies which are able to support also streaming data. This can be accomplished for example by using in the proxy a time window (or buffer) like the time window described above for the servers, so that the proxy for example combines all the requests for the same data that arrive within the time window and requests the data just once and then sends it back to the IP addresses that requested it. Another possible variation is that the proxy first gets the streaming data the first time it is requested and then waits and keeps the data at least for the specified time window to see if there are additional requests for it. This way the data can be sent to the requesters even before the time window is over. On the other hand, if there are many requests, it may be even more efficient if the proxy itself then sends the data as a united package with the list of targets, as in the optimization described above. And this can be even more efficient if it is used in addition or in combination with load distribution systems such as for example Akamai. Another possible variation is that at least some proxies (for example proxies that are preferably at or near the MAIN routers and/or for example special proxies dedicated to streaming data) are also able to keep streaming data for an even longer time window, for example in one or more circular buffers for a few minutes or even for example half an hour or more, and thus enable users also to request for example instant replay and/or retroactive recording even after the event has started. This way, for example if the user tunes in to an Internet Radio or TV station and finds a fascinating program or song but has missed the start of it (or even if he/she hasn't missed the start but decides to record it only afterwards) or for example misses the start of a live lecture in a large scale video-conference or e-learning session, preferably he/she can request to replay and/or save a copy of it from the start of the program or event (as long as it is within the time window limit) and then the proxy can send the user the retroactive data. This way users can request for example instant replay and/or retroactive recording even if the user hasn't been tuned in to that streaming data or source before. When requesting any of these options preferably the user can either specify how many minutes ago to start the replay and/or retroactive recording, or for example request to jump back in a number of steps until he/she finds the start, or request to automatically go back to the start of the event, and in that case preferably the proxy can automatically identify the beginning of events, such as for example song or program (for example by content analysis but more preferably by a code which is broadcast along with each event and preferably identifies both the name and type of the event and its beginning and end). Another possible variation is that different time windows can be used for different events (such as for example only up to a few minutes for a song and for example up to half an hour for TV programs or lectures). Another possible variation is that certain events for example carry also a code specifying the requested time window for that event, so that for example for more important events the proxies can be requested by the source of the streaming data to allow a longer retroactive time window. Of course, another possible variation is that in addition or instead the sources of the streaming data themselves also keep such temporal buffers and similarly allow users to request instant replays up to a certain time limit after the start of events. Another possible variation is to allow the replay in larger jumps, such as for example 15 or 30 minutes into the past, so that many users can view it at the same time, thus saving bandwidth by using more combined packets. Another possible variation is, like with the example of transferring large files, that for example even if users don't want to start viewing at exactly the same time, requests for data can be combined even if some users start at a later point, and then for example only the missing starting parts are transferred separately to each user, preferably while at the same time the common parts are transferred simultaneously in combined packets to many users in the same general area. Another possible variation of this is that at least some of the main routers can also function as such proxies themselves. This means that when these routers also act as proxies, they are preferably able to cache data and preferably also able to create by themselves combined packages in an efficient manner like when the server itself creates it. Preferably this can be done for example both in optical and non-optical routers, but if it is done in optical routers, then preferably the cached data is optically stored for example in delay lines and/or some type of optical memory for temporary storing of packets data, such as for example holographic memory, or for example the newly discovered methods for considerably slowing light for example in chilled Sodium gas, or stopping it for example in Rubidium gas with the help of additional laser beam or beams, and then releasing the light again at will. Another possible variation is to store such cached data in normal RAM or electromagnetic storage also in optical routers, since typically such cache data may need to be stored for longer time windows than the times needed for making routing decisions. The above optimizations can be done also independently of the other features described in the present invention, and also non-optical routers can deal with it. However in non-optical routers preferably the headers (or parts of them) are also marked electronically (or at least logically) so that the router can more easily access them without having to go through the data part of the packet except when needed. This optimization can work similarly also in other Networks of interconnected devices such as for example with Mobile Internet-connected devices, such as for example cellular phones or palm devices or mobile computers connected through cellular networks, especially when they will have also at least a crude general-area GPS. Preferably in this case at least part of this optimization is continued also for example by the cellular company's cells and/or by special routers so that the optimization can continue up to the level of cells or groups of cells. This can be very useful for example in the $3^{rd}$ generation cellular networks, since they will need to support also more heavy traffic such as for example streaming video, etc.

Figure 1C:
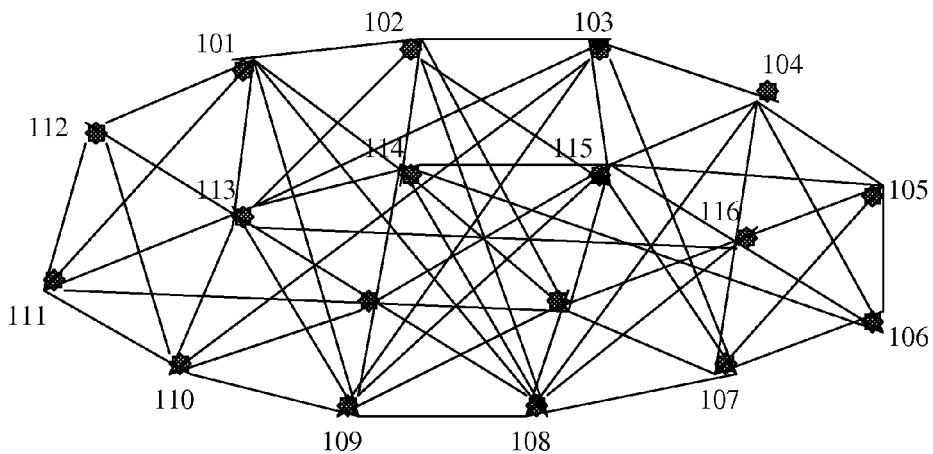
FIG. 1c is a simplified illustration of a preferable example of connections between MAIN routers.

Referring to FIG. 1c, we show a simplified illustration of a preferable example of connections between a small number of MAIN routers (101-118). For simplicity, only a small number of MAIN routers are shown, and no intermediary or lower-level routers and their links are shown, but in reality, as explained in the reference to FIG. 1, preferably between the MAIN routers there are also interconnected intermediary and lower-level routers, which reach smaller parts in each area, and there can be more than two levels in the hierarchy, such as for example using also one or more levels of intermediate-level routers between small routers and MAIN routers. As explained already in the reference to FIG. 1, the MAIN routers are preferably also connected directly with high-bandwidth as peers between each other (at least each one to its more close neighbors, but preferably with many redundancies and preferably connected directly also to remoter peers who are at least up to a few hops away or even for example on the other side of the Internet, which further increases efficiency and increases robustness if a MAIN router falls for any reason) without having to go through lower-level routers in order to reach their peers, so that once a higher-level router (and especially if its one of the MAIN routers) decides to forward a packet (or a group of packets) to a higher-level peer, preferably the packets don't have to go through lower level routers. This can automatically increase the likelihood of having higher bandwidth to the next peer and automatically reduce the number of routing decisions needed in order to reach the next peer. This drawing shows only MAIN routers, which are at the highest levels of the hierarchy, but as explained in the reference to FIG. 1, similar principles can preferably apply also to intermediary-level routers in the hierarchy. For simplicity, each link is shown as a single line, but for redundancy each link can be for example based on a number of actual connections, not necessarily going through the same route.

Figure 2:
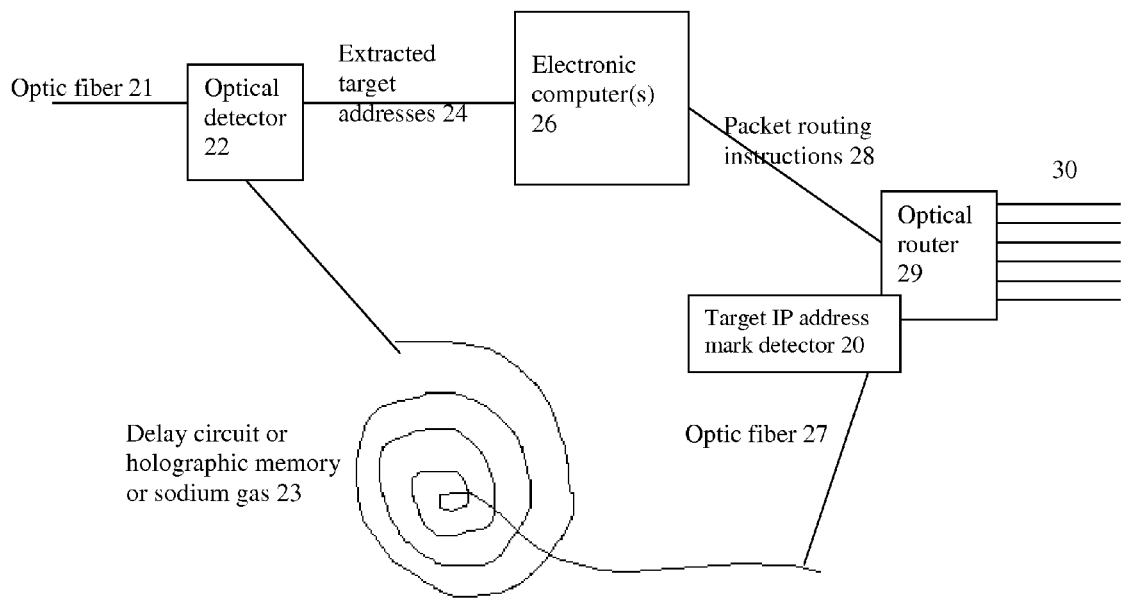
FIG. 2 is a schematic illustration of a preferred way in which the fast packet switching optical router works.

Referring to FIG. 2, an optic fiber (or more than 1 fiber) (21), preferably carrying a single lambda (after the lambdas have been separated each to a different optic fiber), enters the optical detector for the marked target addresses (22). Preferably this is done by optically duplicating the bit stream from the fiber into two or more branches, so that reading the signals does not disrupt the optical bit stream. The detection is preferably done with a very fast and sensitive photo-diode or photo transistor, which detects the optically obtrusive mark and then extracts only the relevant bits that follow it. The detector (22) preferably translates the target address bits to electronic bits for processing by electronic computer or computers (26), with single or multiple processors, but this can also be done for example with a photonic computer (such computers might become available within the next few years), and in that case the translation to electronic bits is not needed. The extracted target addresses (24) are transferred to the computer or computers (26) for analyzing with the database and making the packet switching decisions, while the light bits are preferably passed through a delay circuit (23). This can be done, for example, by using a spiral of up to a few kilometers of optic fiber, preferably rolled around an element of the router. So, for example, since the speed of light is approx. 300,000 km per second, the time the light spends in a router with a length of 1 meter is approx. 3.33 nanoseconds, and by forcing the light to go for example through an optic fiber spiral of 3 kilometers, the time for making packet switching decisions will be increased from 3.33 nanoseconds to 10 microseconds. By using for example a bundle of 10 or 100 optic fibers within the same jacket of the delay circuit and forcing the light to go through all of them serially, this factor can be increased 10 or 100 times. However, it is preferable to use for the delay spiral optical fibers without the jacket or with a very thin jacket (such as for example very thin plastic coating), and preferably only cover the entire spiral or larger parts of it with a protective jacket. Another possible solution is for example to use a solid stable box of mirrors in which the light will travel at certain angles so as to create a very long path until coming out again. But the previous solution is much easier and safer to implement. The faster the processing speed that is established, the smaller the delay needed. Preferably, the router is able to choose among a number of delays, preferably by being able to choose one of a number of entry points into the delay circuit. So, for example, if the computing power has been significantly increased, or the computational requirements have been decreased by using some pre-processing of the target addresses and general destination labels or by using physical addresses as described above, the same router can easily start supporting smaller delay times. Preferably, the fibers in the spirals are protected from possible cross-talk for example by coating them in a thin layer of dark opaque color. If the spiral is very long, for example a few dozens of kilometers or more, preferably it might include also amplification for example by Erbium or Raman amplifiers, in order to correct for the attenuation of the signals. Other possible variations are to use for example some type of optical memory for temporary storing of packets data, such as for example holographic memory, or for example the newly discovered methods for considerably slowing light for example in chilled Sodium gas, or stopping it for example in Rubidium gas with the help of additional laser beam or beams, and then releasing the light again at will. Various combinations of these or similar solutions could also be used. More than one detector for the optical marks may be used for increasing speed or reliability. The packet routing decisions (28) are then transferred into a fast optical router (29) while the light bits are entered into the optical router (29) through optic fiber (27). The fast optical router (29) preferably uses fast optical switches such as for example those developed by Trellis-Photonics or Lynx, for routing the light bits into the requested output fibers (30) without ever converting them into electricity and back. If an optical switch like the one by Trellis-Photonics is used, then preferably it is a variation of that technology that does not depend on wavelength but simply activates one of a set of holograms on command, to transfer the incoming bit stream to the desired destination outlet. Another variation is that the command to this switch takes into account the lambda of the bit stream being processed. Another variation could be to shift the wavelength by optical means to whatever is more convenient, which might be needed in configurations where more than one input fibers have to compete for the same output fibers and there are collisions between outgoing lambdas, as explained later below. Preferably, the packet routing instructions (28) can tell the router (29) where each packet begins and ends for example by specifying the exact time frame for each packet. Preferably, at the optical router (29) an additional target IP address mark detector (20) is positioned in order to find again the same marks for ensuring correct synchronization between the packet switching instructions and light bits.

Another problem is that since the fast optical routers (29), such as for example those by Trellis-Photonics or by Lynx, currently require at least a few nanoseconds for response time, they will not be able to cut the packets at the exact bit positions on the boundary between each two packets, if the bit rate is too high. This does not necessarily mean that the entire response delay is translated into a "cutting" error, since part of the delay can perhaps be compensated for by shifting the "cut" command a little earlier in time, taking into account the delay in response. The easiest way to solve this is to use solution number 4 or 5 and put the noticeable consecutive period of light (in solution 5) or no light (in solution 4) at the beginning of the packet and make this period long enough to compensate for any errors caused by the response time of the router. So for example, if the "cutting knife" is 500 times cruder then the point it has to cut, then we preferably make the consecutive period at the length of at least a 1000 bits, in order to take into account this margin of error. However, this only ensures the integrity of the packet itself, whereas the long mark can be partially truncated in the process. So it is possible to use this solution only if appropriate measures are taken to lengthen the mark again at each "cut point". This can be done for example if the routing switch itself in the router (29) is automatically programmed to add a similar long mark on the point that it cuts before letting the bit stream pass. (For example, upon receiving the "cut command", the router can route the packet bit stream into a very short delay circuit, insert into the output channel a stream of constant light for the mark, and route the packet bit stream into the output channel). This means, however, that the exact length of the marks can change as they pass various routers on the way, so the mark detectors (22) need to know this and look first for the end of the mark before starting to extract data. Also, during the unstable period of the response time, the added mark might not be stitched properly, so there might be some "garbage" before and after the added mark, and the mark detector needs to take this also into account. Also, it might be possible to avoid or at least minimize these "bad stitches" by using overlap with the constant light during the unstable period. However, this example has assumed that the long mark is a consecutive period of light. On the other hand, if the long mark is a consecutive period of darkness, no additional beam of light is needed, and the stitch can be much cleaner. In the case of using darkness, there is an additional problem that periods of silence (no transmission) may look like the darkness mark, but this is very easy to solve, since the mark detector regards the packet anyway as beginning only after the darkness ends. However, this might not be enough, since the address processing protocol might require also adding or changing data, such as for example adding a MAC header to the packet in the data link layer (layer 2) or changing the MAC header. In order to enable this, the newly inserted mark preferably also carries information, by using for example fatter bits. This way, any data that needs to be added or changed at the router (29) can be included in this mark. (This can be done also for other layers, if needed). Another possible solution is to duplicate the light by optical means, preferably before entering the fast optical router (29), so that we have at least 2 copies of the light bit stream. Assuming for example that the margin of "cutting" error is about 500 bits, and we have to make a cut between packets a and b, so preferably we send for example 1000 additional bits to the route where packet a is going after the logical end of packet a, taking these bits from the first copy of the bit stream, and we use the $2^{nd}$ copy of the bit stream to start sending bits to the route where packet b is going, for example 1000 bits before the logical start of packet b. In other words, in this solution one of the bit stream copies is used for routing the even packets (and is regarding the odd packets as slack area) and another copy of the bit stream is used for routing all the odd packets (and is regarding the even packets as slack area). In this solution the surplus bits from the slack area are preferably later discarded or ignored. This solution for this example assumes that the size of each packet is at least 1000 bits long, so packets shorter than this are preferably padded in advance with appropriate trailing bits. If the router also needs to add or change some data, then the previously described mechanism for adding or changing data or a similar mechanism has to be used also in this solution. (Another possible variation of this solution is to use alternating polarizations for the odd and even packets in each lambda, as described at the end of solution no. 6 in the summary of the invention. In this case, using appropriate polarization filters can automatically get rid of the surplus bits from the slack areas. Another possible variation of this solution is to use alternating wavelengths for the odd and even packets in each lambda, as described at the end of solution no. 2 in the summary. In this case, using appropriate wavelength filters can automatically get rid of the surplus bits from the slack areas. However, these two variations are problematic and less desirable). Another problem is that all of these solutions are adding extra data at the cutting points (either in the form of the long consecutive mark or in the form of normal bits). Of course the error-correction layer (typically layer 2) should be aware of this so that it will not be confused by the extra data. Anyway, the extra data causes no confusion in the solution of using long marks, because the packet always begins after the mark ends. In the other solution, the extra bits also should not cause confusion because we have a mark for the beginning of each packet, and the packet header contains information about its size, so the "garbage" data can be easily ignored. Preferably, the garbage data is eventually discarded before exiting the system of routers that comply with the present invention. However, since extra bits are added at every router in this system between each two packets, the amount of "garbage data" can accumulate. This is not such a big problem, since assuming for example even up to 100 routers between the origin to the target and a garbage size of up to 1000 bits as in our example (the exact amount depends on the ratio between the response time of the router (29) and the speed of the bit stream, and changes of course each time according to the actual "cutting error"), each packet can accumulate at most 100,000 bits of garbage on the way, which are about 12.5 Kilobytes. Since packet size will typically increase as the network gets faster and faster, this is not a big problem. The problem is even smaller, since usually much less than 100 routers are needed between any two points on the Internet, typically no more than 20 routers. (By the way, if we assume an average of 20 of our routers on the way between any two points on the Internet, each for example with a 3000 meters delay circuit, then the total delay caused by these routers is about the time it takes the light to travel 300,000 meters=300 kilometers, in other words just 0.2 milliseconds delay for the entire journey). So one solution is to do nothing about controlling the amount of accumulated "garbage". However, it is also possible to make sure that the garbage does not increase significantly beyond the needed safety margin: In the long mark solution, preferably the mark detector (22) simply reports to the decision making computer (26) also the size of the mark, and then if the size of the mark is already large enough (for example, twice or more of the normal size), preferably the "cutting" router (29) can be told in this case to add a smaller mark or no mark at all. (Another possible variation is the reverse of this: Starting with a mark long enough for being cut for example by 20 routers, and increasing the mark only if it becomes too short). However, if the mark is used also to write new information at the router, or to change information, such as for example the MAC header, preferably by using for example fat bits in the mark, then the mark has to be written even if the previous mark is already long enough, so the length control is preferably done in this case by giving the "cut" command earlier, so the new mark will overwrite part of the older mark. However, to avoid confusion between info written in the new mark and info written in the old mark, the procedure preferably makes sure that the new mark will always overwrite the old mark in a way the bits of the new mark will always start before the bits of the old mark. In the solution that duplicates the bit stream and uses the adjacent packets as slack area, so that the packets become separated by "garbage bits", preferably the mark detector (22) extracts from the header also the bytes representing the packet size and preferably also reports the distance till the next packet, and so the decision making computer (26) can decide if the garbage is already too long, and then preferably tell the router (29) to add less or no slack bits in this case by making the cut at the end of the packet earlier. This will usually not significantly delay the computer (26) since typically the detector (22) can tell the computer (26) what is the distance to the next packet long before the computer (26) has made its routing decision. Of course, the method of using long marks can be combined with the method of duplicating the bit stream. Also, preferably the router (29) is also able to drop packets (when needed for example because of network congestion) or delete any other data, which is very easy for example by simply routing discarded data to a dump line. It is possible to mark also the end of packets, but it is much more efficient to use the packet size from the header for finding the correct size.

Of course, various integrations or separations of various elements of this invention can be made, so that for example using stronger parallel computers might enable the decision making computer (26) for example to give services to more than one lambda at the same time. In the other direction, assuming for example an average queue of 40 packets traveling in the delay circuit (23) at the same time, either 1 computer (with single or multiple processors) makes the packet switching decisions for these packets, or more than one computer is used there so that the load can be divided. The length of the delay circuit (23) and the size of the packets determine of course the number of packets in the delay circuit at the same time. However, with the current state-of-the-art rate of about 10 Gigabits per second per lambda, each bit is the size of about 30 mm, so a delay circuit of 3000 meters (=3 million mm) contains 100,000 bits, which are 12.5 Kilobytes, and a delay circuit of 30 km contains 125 Kbytes. Therefore, especially as the traffic goes bigger and the packet size increases, there will probably be just 1 or a few packets at a time in the delay circuit, at least until the bit rate increases considerably. One of the advantages of the present invention is that it is very easily scaleable and its speed depends much more on the number of packet headers it has to deal with than on the speed of the bit stream, so that for example as the Internet grows and traffic carries heavier data, such as for example Video, virtual reality data, etc., preferably much larger packets will be used compared to the typical packet sizes today. So, for example, if the Internet becomes a 100 times faster and the average packet sizes become a 100 times larger, the routers of the present invention will still be able to handle very efficiently this much faster bit rate. Additionally, if the entire packet header or at least the important parts of it are also encoded in fat bits (compared to the rest of the data), the system will be able to handle the header easily even if the bit stream becomes extremely fast. Another possible variation of this is that if the bit-rate of the data becomes extremely fast, preferably the error correction layer or layers can also postpone checking and dealing with errors to a later point after the router. So, for example, if much faster bit rates per lambda are accomplished, for example by using much shorter wavelengths, the router can handle the fat bits of the headers even if the bit-rate of the data itself becomes so fast that the router can't even read it. This makes this solution very desirable. Preferably, if fat bits are used both in front of the header and in the header, the mark in front of the header uses a different fatness level, to avoid confusion with the header. An additional advantage of the present invention is that the use of the delay circuit like a production line enables us to handle even packets that are bigger than the size of the delay circuit.

On the other hand, if more than one input fibers are sharing the same output fibers, we need to add some limitations and additional mechanisms for handling problems when more than one packets with the same wavelength (or group of wavelengths, if we use more than one lambda as a single channel) need to enter the same exit fiber before the other one finished passing. There are a number of possible solutions for this: 1. Use at least a few fibers for each destination route and possibly also for each source route. This way we have more flexibility in choosing alternative output fibers in such cases of collision and more statistical chance of solving it like this, and as the Internet grows, more fibers will be used anyway for each route. Another possible variation of this is to have also spare output fibers that can be used for example in cases of high overload. 2. Convert, preferably by optical means (such as for example interferometric cross-phase modulation wavelength converters that use semiconductor optical amplifiers), at least one of the colliding bit streams into another available lambda within the range of usual lambdas. Another variation of this is for example in times of high overload, to use also conversion to some additional lambdas which are not normally used. This can be done for example by using a series of one or more quantum-cascade lasers, which can give high-efficiency in almost any desired frequency in the near infra-red range (750-2600 nano) and using the original bit stream as a pump for boosting a signal of a nearby frequency, and, if more than one step is needed, then in the next step the amplified signal can be used as the new amplification pump. This conversion might be done for example by letting the relevant bits streams pass through special flexible or fixed converters, or by routing them to special delay lines which contain also the converters. This solution is of course irrelevant if all of the lambdas are used as a single channel (unless for example Raman amplifiers are used instead or in addition to Erbium amplifiers, and so a whole range or ranges of alternate lambdas are available), but might be at least partially possible if only subsets of the lambdas are used as single channels. 3. Preferably only in such cases of collision, at least one of the colliding bit streams is routed into one or more additional delay circuits (or, if optical memory is used, temporarily stored in one of the available optical memories), hoping that by the time it comes out the collision problem will no longer exist. Preferably, if the collision is not solved for example after a certain amount of time or a certain number of delays, the problematic packet or packets can be dropped for example by routing them into a dump line. Preferably, available free delay lines (or optical memory) are not limited to specific fibers but can be used by any of the fibers on a need basis. Preferably there are a large number of spare delay circuits for cases of traffic overload, and preferably a large range of sizes of them is available, so that the length of the delay line can be chosen for example according to the length of the colliding packets that are currently occupying the needed output channel or channels. (For example, spirals of 10-micron fibers with lengths of thousands of kilometers without jackets can occupy very little space, so thousands of them can easily fit together, either in separate or in parallel spirals). 4. Use other optical separators to prevent bit streams of the same lambda entering the same output fiber from causing problems for each other, such as for example using one or more different polarizations in such cases, preferably by letting the colliding bit streams pass though appropriate polarization filters. However, in this case preferably polarization-retaining fibers are used. Of course, all of these solutions preferably require taking into account concurrently the situation in all the output fibers. Various combinations of these solutions can also be used.

Figure 3:
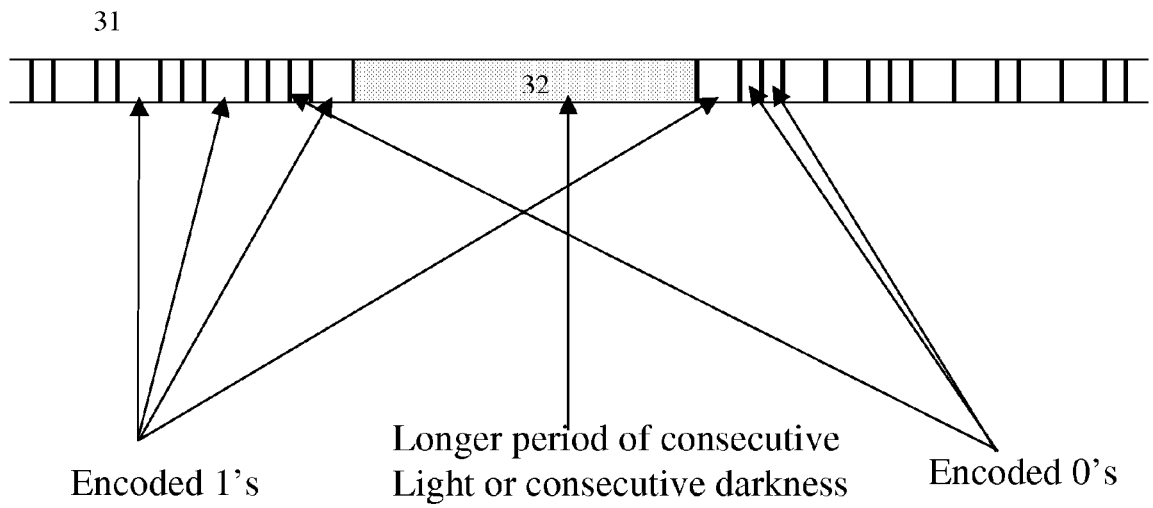
FIG. 3 is a schematic visual illustration of a preferable example of the temporal marks in a single lambda in solutions 4 and 5.

FIG. 3 is a schematic visual illustration of the temporal marks in a single lambda (31) in solutions 4 and 5. The short white squares in this exemplary illustration represent 0's, the long white squares represent 1's, and the short black lines represent small intervals of no light. The considerably longer square (32) represent either a longer period of consecutive darkness (solution 4) or a longer period of consecutive light (solution 5). Preferably the first n bits after the mark are the bits of the target IP address (where n represents the length in bits of the IP address). Implementing this depends on the way 0's and 1's are marked in optic fibers. For example, if 0's are marked by short pulses of light and 1's by longer pulses and the pulses are separated by constant short intervals of no light, then there is no problem to make the longer marks unique by making them considerably longer than the ordinary intervals of 0's, 1's or separators. On the other hand, in solution 4, for example, if 0's were marked by no light, then groups of 0's longer then a certain number would have to be represented as a multiplication factor followed by the 0 sign, so that normal periods of no light would be limited to no longer than a certain period. Same goes for solution 5 regarding 1's. However, since optic fibers are currently not marking 0's or 1's consecutively without separators, there is no such problem.

Figure 4:
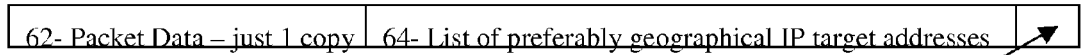
FIG. 4 is an example of a condensed packet for much more efficient distribution of the same data to multiple users.

Referring to FIG. 4, I show an example of a condensed packet for much more efficient distribution of the same data to multiple users. As explained above, identical data packets are preferably grouped in groups so that each group contains a single copy of the identical data packet together with a multiple list of targets, so that each group preferably goes to a certain general area or direction, and when it reaches that general area the data is preferably duplicated and split up into the individual packets, or into smaller groups with less targets, which are later split up into the individual packets. This is preferably done in combination with using the above described hierarchical system of routers and Physical (geographical) IP addresses (preferably for example GPS based), as explained above. As explained above, this efficient distribution can be used for example both when sending data to users and when sending data to various proxies or mirror sites such as for example Akamai servers, and can be especially important for example for streaming video. Of course this can also be done for example by multicast, however multicast requires explicitly joining a specific multicast group, whereas the above optimizations can be done automatically and much more flexibly and can be applied in multiple steps or sections along the way. Another possible variation is to implement the above routing optimizations for example by creating automatically and preferably dynamically multicast groups and/or sub-groups and assigning automatically users to them (and preferably removing them automatically for example when the user's browser is no longer on the page), preferably according to geographic location. This means that the implementation can work in a way similar to the above described optimizations, but for example instead of keeping the list of target addresses in the condensed packet, for example the list of targets is sent first for example to a server or router in the target area, and then the following condensed packets for the same group can be sent for example to that server or router without the list of targets and instead the condensed packets include for example a code that identifies the multicast group and/or the desired list of targets that the server or router in that area already has. Of course, like in the above optimizations, the distribution paths are preferably based on the hierarchical routers system with geographic IP addresses, thus achieving very high efficiency. Another possible variation is for example to use the above-described sending in advance of the target lists even without defining the users in that area as a multicast group. Another possible variation is to allow the automatic creation of multicast groups or sub-groups and automatic joining and removing of users in them also without geographical IP addresses, for example by using the path of different users' browser requests to determine who is close to each other according to their paths, although this is of course less efficient and less reliable than when physical (geographical) IP addresses are used. Of course, like other features of this invention, the above variations of the optimizations can be used also independently of any other features of this invention.

The structure of automatically condensed identical packets is illustrated in FIG. 4. As explained above, preferably the condensed packet (61) contains just a single copy of the identical data (62) and an extended header (63), which contains a normal header (65) (preferably with a mark that indicates that this is actually a condensed packet), and a list (64) of the preferably physical (geographic) IP target addresses of the original packets that contained the same identical data in their body and were condensed in this group. So, for example, when sending the same streaming data (or any other same data) for example to millions of users at the same time, preferably one or more such condensed packets are created, preferably by the sending web server, and each condensed packet goes to a certain general target area, and as it reaches the general target area the condensed packet is preferably replicated and regrouped into smaller groups, each containing less target addresses, and eventually replicated back to single packets with a single target address each, as the packet nears its final destination. As explained above, this can lead to huge savings both in terms of bandwidth and in terms of the number of routing decisions that have to be made on the way.

While the invention has been described with respect to a limited number of embodiments, it will be appreciated that many variations, modifications, expansions and other applications of the invention may be made which are included within the scope of the present invention, as would be obvious to those skilled in the art.

We claim:

1. A system for improving the performance of optical routers on the Internet, cellular networks or other networks, wherein packets with headers are used, comprising:

a) a system comprising means for fast packet switching by dealing only with the headers, without conversion of the packets themselves to electronics and back, and means for compensating for the margin of error that occurs when the response time of the router is too slow for the bit rate, and wherein said compensation is done by means for:

optically duplicating a bit stream and using one copy of the bit stream to route the even packets, so that the odd packets are used as a slack area, and another copy of the bit stream to route the odd packets, so that the even packets are used as a slack area, and means for providing a long mark at the beginning of the packet which is sufficiently larger than the margin of error, said means placing a target IP address at a constant bit distance from the beginning of the packet, and making sure the size of this mark remains long enough for the next router;

b) a hierarchical system that uses geographical IP addresses and bandwidth, in which routers that are higher on the hierarchy have sufficient direct links therebetween, such that the routers can reach peer routers without having to go through lower level routers; and c) a system for grouping together at least one of identical and non-identical packets going to the same general area or direction, wherein the system is adapted such that packets that are identical are grouped together and are also condensed into a single packet with a list of multiple target addresses.

2. The system of claim 1, wherein optical marks are used for fast locating of the headers of optical data packets, further comprising:

a device for creating said optical marks;

a device at the router for optically detecting and extracting at least part of the packet header before delaying light bits;

a device for delaying the light bits at the router for the time needed for making packet switching decisions without having to convert the light bits to electricity;

a computer for comparing said target addresses to the required database and making packet switching decisions;

a fast optical router for carrying out packet switching decisions after the light has passed through the delaying device, without having to convert the light bits to electricity; and a device for compensating for the margin of error that occurs when the response time of said fast optical router is too slow for the bit rate and enabling at least one of addition and deletion of data if required.

3. The system of claim 1, including at least one of:

a) identical data packets from the same source going to the same general area are grouped together and condensed by sending in each group the identical data only once, with a multiple list of targets connected to each copy of the data and sent together to the general target area;

b) non-identical packets from the same source or from different sources going to the same general target area are grouped together without condensing, so that they are routed together more efficiently and later similarly broken down according to physical proximity to the target area;

c) the grouped packets are broken down into smaller groups by the routers in the general target area and finally broken down to individual data packets for delivering to the final actual destinations;

d) the grouped packets are broken down directly by the routers in the general target area into individual data packets for delivering to the final actual destinations;

e) the grouping of the packets is done as a pre-processing by routers;

f) the grouping of the packets is done by the servers themselves, which can be at least one of the original site, a mirror site, and a proxy;

g) a short time window is used on the server for collecting requests for data in order to group the packets together; and h) when downloading at least one of large video files, MP3 files, popular software files, and other large files, the server also combines together in the united packets requests that arrived after an original time window, so that new requests are combined with older requests and thus get first a later part of the file and then get earlier parts of the file later.

4. The system of claim 1, including at least one of:

a) each IP address contains also geographical coordinates and the routers are aware of their own coordinates and the coordinates of at least other main routers;

b) stationary Internet-connected devices have exact coordinates that are updated globally in the Internet when they change location;

c) mobile devices have more general coordinates and their more exact coordinates are updated only locally when they move;

d) routers make their routing decisions mainly by choosing the router whose physical coordinates are closest to the target;

e) the routers also take into consideration at least one of connectivity data and bandwidth data and current load data when such additional data is needed;

f) physical addresses are also combined with additional non-physical codes, so that if there is more than one network-connected device with exactly the same physical coordinates, the additional code can distinguish between them and only the nearest local devices need to carry local tables for choosing between them; and g) physical addresses are combined with additional non-physical addresses, so that network-connected devices are grouped together into small areas, and within each small area non-physical routing tables are used locally.

5. The system of claim 4, including at least one of:

a) each router tries to choose one of the routers directly connected to it that are closest to the physical direction of the target area;

b) unless the target is within its own area, each router tries to choose one of the neighboring MAIN routers (routers that are highest on the hierarchy) that are closest to the physical direction of the target area;

c) each router has already a list of preferable next best hops or best routes for reaching the chosen MAIN router;

d) each MAIN router has the list of locations of all the MAIN routers on the net and tries to choose one of the MAIN routers that are closest to the target area;

e) each MAIN router has the list of locations of the MAIN routers on the net and tries to choose one of the MAIN routers that are closest to the target area;

f) each MAIN router has already a list of preferable next best hops or best routes for reaching the chosen MAIN router;

g) a hierarchy of at least two-levels of routers is used;

h) the higher a router is on the hierarchy, the more bandwidth is associated therewith;

i) routers are also connected directly with high-bandwidth as peers between each other, at least each one to its closer neighbors, without having to go through lower-level routers in order to reach their peers, so that once a higher-level router decides to forward a packet or group of packets to a higher-level peer the packets do not go through lower level routers;

j) lower level routers are used locally, and in order to get to other areas a lower level router forwards packets to a nearby MAIN router, which then forwards the data through direct connections to other MAIN routers, and only at the target area lower level routers are used again, in order to reach the final target;

k) at least one of load distribution systems and caching systems are optimized by placing at least one of mirror servers and proxies especially at close proximity to at least higher-level central routers on the hierarchies;

l) when updates are initiated from a data source to minor sites, the updates are distributed to all minor sites at the same time, thus automatically utilizing the optimization of routing together packets going to the same general areas;

m) when updates are initiated from a data source to minor sites, the updates are distributed to all minor sites the same time, thus automatically utilizing the optimization of routing together packets going to the same general areas; and n) at least one of streaming audio data and streaming video data is also constantly updated between the origin of the data to the main centers and/or sub-centers even before requested by any user.

6. A method for improving the performance of optical routers on the Internet, cellular networks or other 6 networks wherein packets with headers are used, comprising the steps of:

a) using fast packet switching in optical routers, by dealing only with the headers without conversion of the packets to electronics and back, and compensating for the margin of error that occurs when the response time of the router is too slow for the bit rate, by:

optically duplicating bit stream and using one copy of the bit stream to route even packets, so that the odd packets are used as a slack area, and another copy of the bit stream to route the odd packets, so that the even packets are used as a slack area, and using a long mark at the beginning of the packet which is sufficiently larger than the margin of error, and placing a target IP address at a constant bit distance from the beginning of the packet and making sure the size of this mark remains long enough for the next router;

b) using a hierarchical system that uses geographical IP addresses and bandwidth, in which routers that are higher on the hierarchy have sufficient direct links therebetween such that the routers can reach peer routers without having to go through lower level routers;

c) grouping together at least one of identical and non-identical packets going to the same general area or direction, wherein the system is adapted so that packets that are identical can be grouped together and are condensed into a single packet with a list of multiple target addresses.

7. The method of claim 6, further comprising:

delaying the light bits at the router for the time needed for making packet switching decisions without converting light bits to electricity;

optically detecting and extracting at least part of the packet header at the router before delaying the light bits;

comparing said target addresses to the required database and making packet switching decisions;

carrying out said packet switching decisions after the light has passed through the delaying device, without converting the light bits to electricity; and enabling at least one of addition and deletion of data if required.

8. The method of claim 7, including at least one method step selected from the group consisting of:

a) delaying the light bits at the router by means of an optic delay circuit that the light has to run through;

b) delaying the light bits at the router by at least one of holographic memory, stopping and storing the light in gas, and permitting the light to pass through chilled sodium gas or another medium that considerably slows the light;

c) processing some addresses in advance, so that the packet has also a destination label that aids making faster packet switching decisions;

d) converting target addresses into electrical data and making packet switching decisions are by an electronic computer;

e) making packet switching decisions by a photonic computer;

f) for adding data or changing data, routing the packet bit stream into a short delay circuit, inserting new data into the output channel, and routing the packet bit stream into the output channel;

g) regarding a group of lambdas as a single channel for packet switching, so that the group is routed together with the same routing decisions;

h) regarding all lambdas as a single channel for packet switching, so that the entire group is routed together with the same routing decisions; and i) regarding groups of fibers as a single channel for packet switching, so that each group is routed together with the same routing decisions.

9. The method of claim 6, wherein said compensation for the margin of error includes at least one step selected from the group consisting of:

a) arranging in advance that all the packets are of at least a minimum required size; and b) making sure the size of the long mark remains long enough for the next router by at least one of adding a further and similar long mark after every cut, adding a further and similar long mark after the cutting only if the existing mark is not long enough, and staring in advance with a mark long enough for multiple routers.

10. The method of claim 7, wherein said marks are made by at least one of:

a) a change in frequency, and an optical detector for the marks looks for a change in frequency;

b) a change in amplitude, and the optical detector for the marks looks for a change in amplitude;

c) an easily detectable period of no light, and the optical detector for marks looks for a period of no light;

d) an easily detectable period of consecutive light, and the optical detector for marks looks for a period of consecutive light;

e) an easily detectable period of consecutive light that is also marked by significantly increased intensity of the light, and the optical detector for marks also looks for a period of more intense light;

f) a change in polarization, and the optical detector for marks looks for a change in polarization;

g) an easily detectable period of fat bits that can also carry data, and the optical detector for marks looks for a period of fat bits;
h) a relative time shifting of the waves of the different lambdas, and the optical detector for marks looks for a change in wave phases;
i) an easily detectable period of no light before the beginning of the packet, and the optical detector for marks looks for a period of no light, and said period is always kept long enough to compensate for the margin of error caused by the response time of the router;
j) an easily detectable period consecutive light before the beginning of the packet and the optical detector for marks looks for a period of consecutive light, and said period is always kept long enough to compensate for the margin of error caused by the response time of the router; and
k) an easily detectable period of fat bits that can also carry data and said optical detector of marks looks for a period of fat bits and said period is always kept long enough to compensate for the margin of error caused by the response time of the router.

11. The method of claim 7, wherein a plurality of input fibers share the same output fibers, and at least one additional mechanism is used for handling problems when more than one packet with conflicting wavelengths need to enter the same exit fiber before another packet has finished passing, wherein said additional mechanism is selected from the group consisting of:
a) a mechanism based on using at least a few fibers for each destination route, so that there is more flexibility in choosing alternative output fibers in such cases of collision;
b) each lambda is used as a separate channel and said mechanisms are based on optical conversion of at least one of the colliding bit streams into another lambda;
c) subsets of lambdas are used each as a single channel and said mechanisms are based on optical conversion of at least one of the colliding bit streams into another non-conflicting group of lambdas;
d) at least two different polarizations are used by letting the colliding bit streams pass though appropriate polarization filters;
e) routing at least one of the colliding bit streams into at least one additional delay circuit, hoping that by the time it comes out the collision problem will no longer exist, and, if the collision is not solved, problematic packets are dropped; and
f) routing at least one of the colliding bit streams for temporary storage in an optical memory, hoping that by the time it comes out the collision problem will no longer exist, and, if the collision is not solved, problematic packets are dropped.

12. The method of claim 5, wherein for making the transition to this hierarchical architecture more efficient, the current structure of backbones and higher bandwidth connections is analyzed for automatically defining at least part of the hierarchy structure.

13. The method of claim 12, including at least one of:
a) performing said analysis automatic statistical analysis, and after the initial structure is analyzed and the geographical position of at least the more significant routers is specified, the basic geographical hierarchy is automatically defined, and then later improved for achieving better optimizations;
b) achieving further optimizations by finding where at least one of more connections and more bandwidth are needed, and adding them accordingly;
c) achieving further optimizations by deciding where more MAIN routers are needed, and adding bandwidth and more direct connections to routers that are chosen to become MAIN routers;
d) automatically repeating the analysis often, for obtaining constant follow-ups over the growth of the net and the connectivity of various parts of the net, and for locating and fixing at least one of weak links and vulnerable junctions in advance;
e) in order to further facilitate the conversion into the above described hierarchies, and since the net currently contains many interconnected independent networks that are connected between them on borders called NAPs (Network Access Points), which are problematic junctures, adding at least one MAIN router with high broadband direct contacts to their peers at other networks at the center or centers of each important network; and
f) adding more direct links along borders between networks, which is facilitated since there is no more need for complex routing tables at the borders.

14. The method of claim 6, wherein at least some proxies keep streaming data in at least one temporary buffer for a specified time window that enables users to also request at least one of instant replay and retroactive recording even if the user hasn't been tuned in to at least one of the streaming data or that source before, including at least one of:
a) said proxies are near at least one of MAIN routers, and lower level central routers on the hierarchies;
b) at least one of the instant replay and retroactive recoding are used with at least one of Internet Radio, Internet TV, video-conferences, and e-learning sessions;
c) different time windows are used for different events;
d) at least some events also carry a code specifying the requested time window for that event, so that proxies can be requested by the source of the streaming data to allow a longer retroactive time window;
e) replay is allowed in a few discrete time shifts, so that many users can view the replay at the same time, thus saving bandwidth when multiple packets going to the same physical direction are combined;
f) requests for data are combined even if some users start at a later point, and then only missing starting parts are transferred separately to each user, while at the same time the common parts are transferred simultaneously in condensed packets to many users in the same general area.

15. The method of claim 6, including at least one of:
a) grouping together identical data packets from the same source going to the same general area and condensing by sending in each group the identical data only once, with a multiple list of targets connected to each copy of the data and sent together to the general target area;
b) grouping together non-identical packets from the same source or form different sources going to the same general target area without condensing, so that they can be routed together more efficiently and later similarly broken down according to physical proximity to the target area;
c) breaking down the grouped packets into smaller groups by the routers in the general target area and finally broken down to individual data packets for delivering to the final actual destinations;

d) breaking down said grouped packets directly by the routers in the general target area into individual data packets for delivering to the final actual destinations;

e) performing said grouping of the packets as a pre-processing by routers;

f) performing said grouping of the packets by the servers themselves, which are at least one of the original site, a mirror site, and a proxy;

g) using a short time window on the server for collecting requests for data in order to group the packets together;

h) when downloading at least one of large video files, MP3 files, popular software files, and other large files, combining together by the server in the united packets, requests that came after the original time window, so that new requests can be combined with older requests and thus get first a later part of the file and then get earlier parts of the file later.

16. A method of improving routing efficiency and bandwidth utilization efficiency in the Internet, cellular networks or other networks of interconnected devices, wherein proxies are used which work with streaming data by using short time windows to combine requests for data together, and wherein:

a) after obtaining the data, said proxies also group together identical data packets from the same source going to the same general area by sending in each group the identical data only once, with a multiple list of targets connected to each copy of the data and sent together to the general target area; and b) at least some of the routers function also as said proxies.

* * * * *